(12) United States Patent
Englund et al.

(10) Patent No.: US 12,730,262 B2
(45) Date of Patent: Sep. 8, 2026

(54) MANAGING COUPLING OF OPTICAL MODES WITH QUANTUM STATE EMISSION ELEMENTS

(71) Applicant: Quantum Network Technologies, Inc., Boston, MA (US)

(72) Inventors: Dirk Robert Englund, Brookline, MA (US); Brendan John Shields, Cambridge, MA (US)

(73) Assignee: Quantum Network Technologies, Inc., Boston, MA (US)

( * ) Notice: Subject to any disclaimer, the term of this patent is extended or adjusted under 35 U.S.C. 154(b) by 303 days.

(21) Appl. No.: 18/502,263

(22) Filed: Nov. 6, 2023

(65) Prior Publication Data

US 2024/0345318 A1 Oct. 17, 2024

Related U.S. Application Data

(60) Provisional application No. 63/440,477, filed on Jan. 23, 2023.

(51) Int. Cl.
*G02B 6/122* (2006.01)
*B82Y 10/00* (2011.01)
*H04B 10/70* (2013.01)

(52) U.S. Cl.
CPC ............ *G02B 6/1228* (2013.01); *B82Y 10/00* (2013.01); *H04B 10/70* (2013.01)

(58) Field of Classification Search
CPC .............................. G02B 6/1228; H04B 10/70
See application file for complete search history.

(56) References Cited

U.S. PATENT DOCUMENTS 7,889,992 B1 2/2011 DiVincenzo et al.
2018/0069631 A1 3/2018 Ashrafi
(Continued)

FOREIGN PATENT DOCUMENTS

WO WO-2022209352 A1 * 10/2022 ............... G02F 3/00

OTHER PUBLICATIONS

English translation of WO 2022/209352 (Year: 2022).*
(Continued)

*Primary Examiner* — Sung H Pak
(74) *Attorney, Agent, or Firm* — Young Basile Hanlon & MacFarlane P.C.

(57) ABSTRACT

A method for interacting with quantum states over respective time intervals comprises: providing, from at least one optical fiber interface, a fiber-coupled optical mode that controls optical coupling to and/or from an optical fiber, where at least a portion of the optical fiber extends outside of an interior of a housing comprising the at least one optical fiber interface; providing a quantum state from each quantum state emission element (QSEE) housed on or inside the housing; providing, from each of multiple portions of one or more directional structures, a preferential direction for an associated element-coupled optical mode that controls optical coupling to and from a different respective subset of one or more of the QSEEs; and scanning a scanning structure housed on or inside the housing to change an overlap between the fiber-coupled optical mode and a different respective one of the element-coupled optical modes over each time interval.

32 Claims, 31 Drawing Sheets

(56) References Cited

U.S. PATENT DOCUMENTS

| | | | |
|---|---|---|---|
| 2021/0117845 | A1 | 4/2021 | Choi et al. |
| 2022/0382082 | A1 | 12/2022 | Simmons |

OTHER PUBLICATIONS

M. Prabhu et al., "Individually Addressable Artificial Atoms in Silicon Photonics", Nature Communications, vol. 14, No. 1, pp. 1-14, Feb. 2022, DOI: https://doi.org/10.1038/s41467-023-37655-x.
H. Wang et al., "Electric-Field Programmable Spin Arrays for Scalable Quantum Repeaters", Nature Communications, vol. 14, No. 1, pp. 1-11, Apr. 2022, DOI: 10.1038/s41467-023-36098-8.
C. Li et al., "Multicell Atomic Quantum Memory as a Hardware-Efficient Quantum Repeater Node", PRX Quantum, vol. 2, Issue 4, pp. 1-8, Oct. 12, 2021, DOI: 10.1103/PRXQuantum.2.040307.
P. Dhara et al., "Subexponential rate versus distance with time-multiplexed quantum repeaters", Phys. Rev. A, vol. 104, Issue 5, pp. 1-15, Nov. 2021, DOI: 10.1103/PhysRevA.104.052612.
M. Parniak et al., "Wavevector multiplexed quantum memory via spatially-resolved single-photon detection", arXiv, Cornell University Library, 10 pages, Jun. 14, 2017, DOI: 10.1038/s41467-017-02366-7.
M. Lipka et al., "Entanglement distribution with wavevector-multiplexed quantum memory", IOP Publishing, New Journal of Physics, 13 pages, Jul. 1, 2020, DOI: 10.1088/1367-2630/abf79a.
Tian-Shu Yang et al., "Multiplexed storage and real-time manipulation based on a multiple degree-of-freedom quantum memory", Springer Science, Nature Communications, 9 pages, Sep. 5, 2018, DOI: 10.1038/s41467-018-05669-5.
Extended European Search Report issued in corresponding EP Application No. 25200766.1, dated Dec. 22, 2025.

* cited by examiner 1006
1004
Diamond 1002

1008
Diamond 1002

1006
1008
1010
1004
Diamond 1002

1010
1006
1004
Diamond 1002

1004
1006
Diamond 1002

1006
1004
Diamond 1002

1003
Diamond 1002

1003
1012
Diamond 1002

1012
Diamond 1002

MANAGING COUPLING OF OPTICAL MODES WITH QUANTUM STATE EMISSION ELEMENTS

CROSS-REFERENCE TO RELATED APPLICATION(S)

This application claims priority to and the benefit of U.S. Provisional Application Ser. No. 63/440,477, entitled "MANAGING COUPLING OF OPTICAL MODES WITH QUANTUM STATE EMISSION ELEMENTS," filed Jan. 23, 2023 the entire disclosure of which is hereby incorporated by reference.

STATEMENT AS TO FEDERALLY SPONSORED RESEARCH

This invention was made with government support under the following contracts: 22-C-0049 awarded by the National Reconnaissance Office. The government has certain rights in the invention.

TECHNICAL FIELD

This disclosure relates to managing coupling of optical modes with quantum state emission elements.

BACKGROUND

In order to transmit quantum information via qubits from one location to another, one promising platform is to transmit photonic qubits (e.g., optical frequency photons). In some cases, a quantum repeater can be used. While it is possible to transmit quantum information point-to-point without a quantum repeater, there can be advantages to utilizing a quantum repeater in some circumstances.

SUMMARY

In one aspect, in general, an apparatus for interacting with a plurality of quantum states over a respective series of time intervals in a scanning period comprises: a housing comprising at least one optical fiber interface configured to provide a fiber-coupled optical mode that controls optical coupling to and/or from an optical fiber, where at least a portion of the optical fiber extends outside of an interior of the housing; an array of quantum state emission elements configured to be housed on or inside the housing, each quantum state emission element configured to provide a quantum state; one or more directional structures, where each of multiple portions of the one or more directional structure is configured to provide a preferential direction for an associated element-coupled optical mode that controls optical coupling to and from a different respective subset of one or more of the quantum state emission elements; and a scanning structure configured to be housed on or inside the housing and configured to change an overlap between the fiber-coupled optical mode and a different respective one of the element-coupled optical modes over each time interval of the series of time intervals.

Aspects can include one or more of the following features.

The quantum state emission elements comprise quantum state storage elements each configured to receive a quantum state that is temporarily stored and emitted after a duration of time.

The duration of time is longer than the scanning period.

The quantum state emission elements comprise lattice irregularities.

The lattice irregularities comprise light-emitting point defects in a crystal lattice material.

The crystal lattice material comprises diamond, silicon, or silicon carbide.

The optical fiber comprises a single mode optical fiber.

The housing comprises a chamber configured to surround the array of quantum state emission elements, the one or more directional structures, and the scanning structure.

The chamber comprises a cryogenic chamber configured to maintain a temperature within the cryogenic chamber of less than about 10 Kelvin.

The one or more directional structures comprise an array of pillars formed in a material that comprises the quantum state emission elements.

The one or more directional structures comprise a hemispherical optically transmissive material configured to cover a plurality of the subsets of one or more of the quantum state emission elements.

The scanning structure comprises a first scanning element configured to move a location of the optical fiber interface along a first axis.

The scanning structure comprises a second scanning element configured to change the overlap between the fiber-coupled optical mode and different respective ones of the element-coupled optical modes associated with directional structures along a second axis substantially perpendicular to the first axis.

In another aspect, in general, a method for interacting with a plurality of quantum states over a respective series of time intervals in a scanning period comprises: providing, from at least one optical fiber interface, a fiber-coupled optical mode that controls optical coupling to and/or from an optical fiber, where at least a portion of the optical fiber extends outside of an interior of a housing comprises the at least one optical fiber interface; providing a quantum state from each quantum state emission element in an array of quantum state emission elements housed on or inside the housing; providing, from each of multiple portions of one or more directional structures, a preferential direction for an associated element-coupled optical mode that controls optical coupling to and from a different respective subset of one or more of the quantum state emission elements; and scanning a scanning structure housed on or inside the housing to change an overlap between the fiber-coupled optical mode and a different respective one of the element-coupled optical modes over each time interval of the series of time intervals.

In another aspect, in general, an apparatus for interacting with a plurality of quantum states comprises: a housing comprising at least one optical interface providing at least 100 fiber-coupled optical modes, where at least a portion of the optical interface extends outside of an interior of the housing; an array of quantum state emission elements configured to be housed on or inside the housing, each quantum state emission element configured to provide a quantum state; and one or more directional structures, where each of multiple portions of the one or more directional structure is configured to provide a preferential direction for an associated element-coupled optical mode that controls optical coupling to and from a different respective subset of one or more of the quantum state emission elements.

Aspects can include one or more of the following features.

The at least one optical interface comprises one or more multi-mode optical fibers.

The at least one optical interface comprises at least one array of optical cores.

The apparatus further comprises: a scanning structure configured to change an overlap between at least one of the at least 100 fiber-coupled optical modes and at least one of the element-coupled optical modes, over a respective series of time intervals in a scanning period.

The scanning structure is located outside of the housing.

The scanning structure comprises one or more spatial light modulators configured to control optical coupling to and/or from the at least one optical interface.

At least one of the one or more spatial light modulators are located outside of the housing.

The scanning structure is configured to change the overlap between at least one of the at least 100 fiber-coupled optical modes and at least one of the element-coupled optical modes by interfering two or more of the at least 100 fiber-coupled optical modes.

The scanning structure is configured to change the overlap between at least one of the at least 100 fiber-coupled optical modes and at least one of the element-coupled optical modes by selectively exciting one or more of the optical modes of the at least 100 fiber-coupled optical modes.

In another aspect, in general, a method for interacting with a plurality of quantum states comprises: providing, from at least one optical fiber interface, at least 100 fiber-coupled optical modes, where at least a portion of the optical fiber extends outside of an interior of a housing comprises the at least one optical fiber interface; providing a quantum state from each quantum state emission element in an array of quantum state emission elements housed on or inside the housing; and providing, from each of multiple portions of one or more directional structures, a preferential direction for an associated element-coupled optical mode that controls optical coupling to and from a different respective subset of one or more of the quantum state emission elements.

Aspects can have one or more of the following advantages.

A quantum repeater can create entanglement (in some cases, on demand, as a resource) across multiple nodes in an internet like network structure. In some arrangements, quantum repeaters can be used to connect any node to any other node in a future "quantum internet" or "quantum-enabled internet." A quantum repeater with a quantum memory also enables a reduction in the timing constraints, since the quantum memory can maintain entanglement between nodes for a finite lifetime and then connect a series of nodes together as needed, on demand.

One advantage of a quantum repeater is that it, like a classical repeater, extends the range over which entanglement can be created. The fundamental rate loss limit is linearly proportional to transmissivity, i.e., if losses increase, the achievable rate decreases. The use of a quantum repeater allows for the bound to be exceeded, possibly making quantum secure communication (e.g., used to transmit secure keys, etc.), quantum sensing, or distributed quantum computing applications accessible (e.g., in some limit, the rate can be modified from values less than 1 qubits/second to more than 1000 qubits/second).

Some of the techniques described herein facilitate a goal of making a high rate, high fidelity quantum repeater with quantum memory to create entanglement (in some cases, on demand) between remote nodes. In some implementations, the quantum repeater with a quantum memory has a relatively low loss (e.g., in order to enable high rate), has a relatively high fidelity (e.g., reduced decoherence/noise processes), has a relatively high rate (e.g., using high scan speed, in terms of number of qubits/entanglement generations per second), and has relatively long coherence times.

Additionally, some of the techniques described herein can be used to provide scanning confocal optical interfaces that are modular and easy to implement in a cryogenic environment to operate at temperatures of around 10 K and below.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
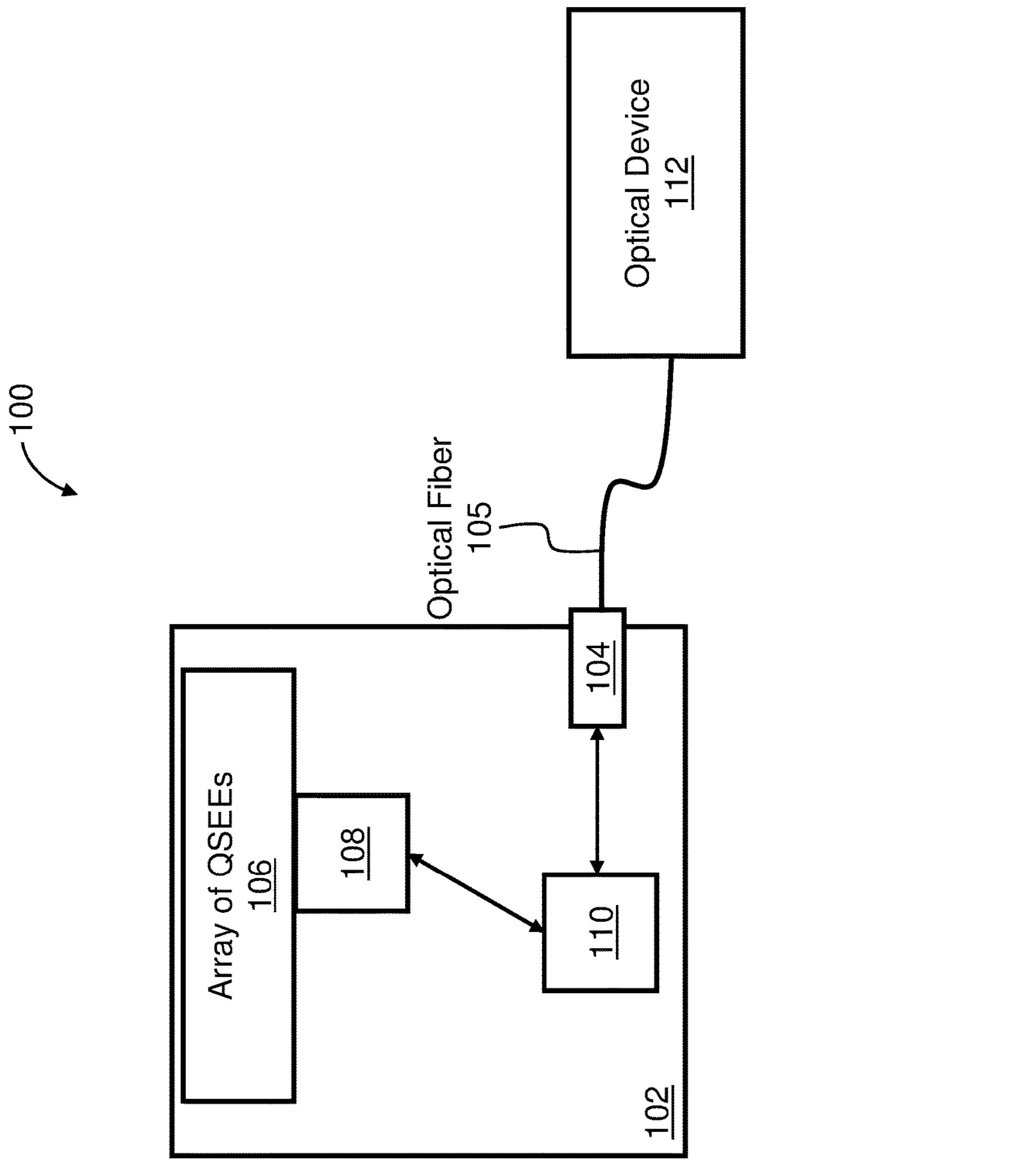
FIG. 1 is a schematic diagram of an example quantum state scanning system.

In some implementations, quantum repeaters can be configured to include an interface to at least one optical fiber (which enables a signal to be sent to other quantum or classical devices, e.g., another fiber coupled device, or a free-space coupled device such as a satellite). The optical signal coupled via the optical fiber interface can interact with atomic memory elements inside a chamber (e.g., a cryostat) of the quantum repeater, possibly representing a large number of quantum channels, $N_{CH}$, which each contain $N_q$ atomic memories. In particular, for spin memories in diamond color centers, such as SiV or SnV, the quantum repeater can be configured to interface to $N_{CH}*N_q \sim N_{qubits} \sim$millions of color centers that are spatially and spectrally resolved.

In some other quantum repeater designs that don't include an optical fiber interface to a cryostat, one approach is to combine large scanning optical microscopes that operate outside of the cryostat and transmit an optical signal through an imaging window to interact with an atomic memory sample on the cold finger in the cryostat (e.g., a He cryostat). However, there can be certain challenges associated with this approach (e.g., large, expensive, and/or complex designs). For example, the large size means that even small differences in the thermal expansion coefficients of materials can lead to a misalignment on the wavelength scale (or diffraction limit), which may require additional motion control, which may in turn make the system even more complex.

Some of the techniques described herein enable a compact, modular scanner that can be fitted inside of a cryostat and that can be capable of performing confocal scanning across quantum memories on a substrate (e.g., a diamond surface). The module including the scanner and the quantum memory substrate may be designed to be relatively small to reduce overhead in motion control. The module can be small enough such that multiple modules can be installed into a cryogenic housing that may have limited available space.

Some implementations of such a cryogenic compatible scanning quantum memory system (or "cryogenically integrated scanner") include the following four subsystems that provide a platform for integrated and automated microscopy of arrays of quantum state emission elements (QSEEs). The distinction of the four subsystems is intended for purposes of clarity, but in some implementations, different subsystems can be combined, modified, or eliminated. (1) Array of quantum state emission elements (e.g., color centers in diamond)—functions as the qubit source and/or quantum memory. For example, a quantum state emission element could be any defect in diamond like a color center (e.g., NV, SiV, SnV). (2) Scanning structure (or simply "scanner")—scans over the array of quantum state emission elements, which is also known as spatial multiplexing. The scanner may also include a module for single spin qubit manipulation (e.g., a microwave controller). (3) Housing (e.g., a rigid but open platform, or a closed chamber, such as a cryogenic chamber that is air tight and includes a cryogenic system to maintain a low internal temperature)—houses the array, in some cases at low temperatures to enhance performance (e.g., to block out phonon dephasing). Some implementations place the scanner inside of the housing. (4) Optical source (e.g., a laser)—optically excites the quantum state emission elements, possibly with frequencies that are "on resonance". In some implementations, the optical source can include a laser and a frequency conversion module for spectral multiplexing. When the array is implemented using color centers in diamond, due to the internal strain of the diamond, the resonant frequency may be different for each color center. Thus, the laser may be frequency shifted when addressing each color center, possibly on the order of a few GHz. In some examples, the system may address multiple color centers in a diffraction limited spot by spectral multiplexing.

In some examples, there may be frequency conversion related to down-converting photons to telecom wavelengths (e.g., telecom bands may include one or more of the O, E, S, C, L, U bands). The nitrogen-vacancy (NV, 636 nm) and silicon-vacancy (SiV, 737 nm) emitted photons, from on resonance excitation, can be down-converted to a more suitable telecom wavelength (e.g., 1260-1675 nm). One benefit from such conversion is that it would allow the cryogenically integrated scanner to interface with existing telecom fiber infrastructure.

At a high level, the cryogenically integrated scanner can be configured to act as a high rate, high fidelity quantum repeater and memory, with indistinguishable photons for output, which can be necessary to erase which-path information for entanglement distribution. The following are figures of merits or metrics for the subsystem containing the array of quantum state emission elements implemented in diamond color centers: photon collection efficiency, temperature/phonon dephasing, color center density (per area), frequency homogeneity (due to strain or lack thereof), scalability (of the process), and repeatable addressability.

Color centers in diamond can be created through blanket implantation of Nitrogen, Silicon, or other Group IV members, followed by annealing. Next, a single color center can be found using an optical microscope, with experiments proceeding to use the single color center. In other examples, a single color center can be located, with a cavity then created around it via lithographic patterning. In these single color center scenarios, factors such as density, frequency homogeneity, and scalability are typically unimportant because only a single color center is used for the experiment.

Since the cryogenically integrated scanner we describe addresses many color centers, which act as memory qubits to store entanglement across multiple repeater nodes (possibly around the world), the above metrics that are often unimportant in the case of a single color center are factors that we account for in various example embodiments. In one embodiment of the cryogenically integrated scanner, photon collection efficiency can be much higher through the inclusion of (1) nanopillars, (2) a paraboloid etched into diamond, or (3) a deposited metal layer, on the backside of thinned diamond, to serve as a mirror for constructive interference. Essentially, designed structures can be used to direct the optical mode into a preferential direction for maximal photon collection efficiency.

In some examples of the cryogenically integrated scanner, we can intentionally design nanostructures (e.g., pillars) at a density that can be addressed by an optical system (confocal or otherwise). The density of addressable color centers can be much higher than those found in diamonds where blanket implantation is used, since they may need to find color centers that are addressable. In contrast, we can obtain addressable color centers by designing and addressing nanostructures that contain one or more color centers. Furthermore, frequency homogeneity can be an important factor because of indistinguishability requirements. Better homogeneity in frequency can lower (or eliminate) the burden of having to frequency shift across several GHz to achieve indistinguishability requirements. One benefit of lithographic patterning is the ability to etch fiducials into the chip, thus providing valuable location information as to which color center the scanner is addressing as the chip is being scanned. Such information can be used in conjunction with a lookup table of the frequency conversion required to convert the resonant frequency of each individual color center back to a common wavelength for indistinguishability purposes.

In other examples, a solid immersion lens (SIL) may be used to enhance photon collection efficiency. In such examples, where there may be no etching of nanopillars or similar structures into the diamond (possibly to maintain low internal strain properties for frequency homogeneity), etched fiducials may be used at the edges or corners of the diamond, which will only locally affect the strain far away from the addressable color centers used.

One possible goal of a scanner is to address as many color centers as possible in a unit time. Addressing with the scanner is a form of spatial multiplexing. The laser subsystem, may include a frequency converter for spectral multiplexing.

The following are figures of merit or metrics for the scanner subsystem: number of total addressable spots (e.g., diffraction limited spot size, field of view, number of diamond chips), speed of scanning, photon collection efficiency at the fiber, consistency of operation, including repeatable location finding (e.g., fiducials and convolution to a ground truth image).

Other scanners used for quantum memory systems that are not fiber coupled are often located outside of the cryogenic system and use free-space coupling of light to the device inside of the cryogenic system (e.g., a diamond). Such free-space coupled scanners have potential limitations due to vibration and alignment (e.g., from cryocooler pumping action), possibly necessitating the use of two nanopositioner stages. In such use, one cryogenically compatible nanopositioner stage may be used inside of the cryogenic system to hold the diamond, while the second nanopositioner stage may be located outside of the cryogenic system.

Furthermore, free-space coupled scanners may require a cryogenic system with a window through which the light is coupled. Correspondingly, systems utilizing a free-space coupled scanner may suffer from infrared (IR) light leakage through the window, possibly limiting the minimum achievable temperature compared to a cryogenic system without such a window. Lower temperature can be particularly useful, since it corresponds to a lower probability of phonon dephasing, which translates to longer qubit memory times. Moreover, blackbody radiation through the window may also adversely affect qubit memory times. Free-space coupling may also require a cryogenically compatible imaging objective, or an objective with a large enough working distance outside the window. The former can be expensive and limited in options, while the latter is possible but causes a diminishing of numerical aperture (NA), thus reducing the photon collection efficiency. Use of an objective can limit the field of view (FOV) options, with many high magnification objectives have a FOV of 100 um×100 um. In terms of scalability, a free-space coupled system may include only one or two windows, possibly limiting the number of addressable diamonds in the system.

Many applications may require coupling into fiber at some location, even in the case of ground-satellite-ground communications. Performing such fiber coupling in conjunction with free-space coupling can be difficult, as it may require managing two systems, one at cryogenic temperatures and one at room temperature (e.g., aligning to diamond inside the cryogenic system, and then aligning a free-space coupled beam, outside of the cryogenic system, with some U-bench setup (or similar) to a fiber. Lastly, free-space coupling can also be susceptible to drifts resulting from ambient temperature changes outside of the cryogenic system.

We now discuss how some of the above factors can be addressed in some implementations of the cryogenically integrated scanner.

By constructing a small, compact, and integrated scanner inside of the cryogenic system, dimensional changes can be quite small, thus mitigating drifts in the pointing of the laser relative to the diamond. Additionally, such an assembly can be designed to be a rigid body that has a very high resonant frequency, mitigating the effects of lower frequency vibrations from the environment (e.g., the cryogenic system, the room). Thus, the cryogenically integrated scanner may mitigate issues arising from alignment and from vibration.

In contrast to free-space coupling, the cryogenically integrated scanner can be configured to operate without a window, since the cryogenically integrated scanner includes an optical fiber interface that transmits light between the inside of the cryogenic system and the outside. Thus, the problem of IR leakage through window can be eliminated, possibly enabling lower cryogenic temperatures as well as a reduction in system cost. Since the cryogenically integrated scanner does not require optical coupling through a window, it may have multiple scanners inside one cryostat, such that the number of addressable color centers may increase. For example, a single cryogenically integrated scanner could include 10 or 20 fiber links, which can be difficult to achieve with free-space coupled systems.

Additionally, the cryogenically integrated scanner enables a single (cryogenic) temperature system for reading out information from the qubit (e.g., a color center in diamond) and coupling into a fiber.

The cryogenically integrated scanner design may also account for tolerances in manufacturing processes. If a fiber has a mode field diameter of around 5 um, roughly all the tolerances of the system boil down to that number, to first order. Typical machining standard can achieve+/−1 mil (~25 um) accuracy, which can pose a problem in terms of optical alignment.

In some implementations, active alignment during assembly may be used (e.g., an active compensator, such as a piezo on the lens(es), used to compensate for shifts or tolerancing by actively refining the position and angle of the optical elements). Thus, instead of one scanning element (e.g., a MEMS mirror), a second scanning element may be used. In such use, one element could scan across the sample, and another could compensate for tip and tilt errors, with the additional benefit of possibly expanding the field of view by correcting some field curvature, since the focal plane is curved in reality. Other implementations can use a micro-electromechanical system (MEMS) scanning element and a deformable mirror for wavefront correction. All of these options would not only help mitigate errors resulting from tolerancing, but would also make the fiber coupling efficiency flatter across the FOV.

The cryogenically integrated scanner may also be configured to account for the compatibility of various elements at cryogenic temperatures. There can be minimal information for most glass, UV curing epoxies, and polymer materials regarding index of refraction or the coefficient of thermal expansion (CTE). Thus, careful design and tests are utilized to determine these material properties in the context of the cryogenically integrated scanner.

In regards to fiber connections, standard bayonet mating connectors (often used at room temperature) may not be suitable to connect FC connectors. Such connectors are often made from material with a relatively large CTE. Thus, in some implementations of the cryogenically integrate scanner, we may design and use a custom housing with low CTE materials (e.g., Invar). Such a custom housing can be particularly useful when collimating the fiber in cases where the axial distance to a collimating aspheric lens is important. In other implementation, SMA connectors which can be repeatably connected for guaranteed axial placement (e.g., bottoming out on the threads of the connector) may be used. In such implementation, active alignment on a collimating lens with some UV curing epoxy in place procedure may also be used.

The cryogenically integrated scanner may also be configured to account for thermal cycling considerations. As the cryogenic system is turned on and off, epoxy could crack or other materials could bind, causing unwanted movement of optical elements which may result in defocusing, aberrations and in general a reduction in optical performance (e.g., photon collection efficiency, spot size which affects number of addressable spots), translating to inconsistent performance over the life of the quantum repeater. Although thermal cycling isn't necessarily a problem in operation, as in theory a cryostat at each node could be in perpetual indefinite operation. In practice, even if a quantum repeater is in production, it will likely experience some thermal cycling in its lifetime, perhaps not thousands of cycles, but at least 10 to 100 for testing, maintenance, etc.

The cryogenically integrated scanner may be designed to operate, in some capacity (e.g., for testing or extrapolation purposes before decreasing the temperature) at both cryogenic temperatures and room temperature. Many tests, except linewidth limited tests (e.g., g2), can be conducted at room temperature. To allow the cryogenically integrated scanner to operate at two disparate temperatures, the system may be athermalized by considering CTE, material data of metals, UV curing epoxies used, etc. Athermalizing may also entail the use of a variety of materials to balance out CTEs (e.g. Invar, Molybdenum, Ti-64) to minimize drifts (e.g., allowing axial positions to remain in focus).

In some implementations, the cryogenically integrated scanner includes numerous optical elements inside of the cryogenic chamber. The use of small elements may be used, since controlling CTE and material changes with temperature (athermalization) over smaller dimensional lengths can be easier. Smaller elements may also make the assembly more of a rigid body, and correspondingly push shift first modal frequency responses to higher frequencies such that vibrations are less of an issue. However, it may be beneficial to construct a system with a high NA for photon collection efficiency, which means a low f/#, or large beam diameter and/or small focal length. A small focal length can be desirable, but may also make assembly difficult (e.g., actively aligning a 2 mm half ball lens or ¼" optic inside a cylindrical cell to micron accuracy can be challenging). One solution could be to increase the beam diameter, but this may require a larger mirror, which can slow down the speed of the scan since mirror speed can decrease quadratically with size.

Power dissipation of components of the cryogenically integrated scanner can also be a consideration in design. For example, a dilution fridge has a finite cooling power at different temperatures (e.g., many fridges have cooling powers on the order of hundreds of microwatts at 100 mK. Such a limitation can mean the scanner should have low power dissipation to maintain low temperature. In some implementations of the cryogenically integrated scanner, an electrostatically actuated MEMS mirror is used, which can have minimal power dissipation as it is driven capacitively. The scanning element may be driven resonantly, with a Q-factor inversely proportional to temperature, such that energy dissipation may decrease rapidly with lower temperature.

For solid state MEMS devices, where the mechanical component is actuated via charge carriers, intrinsic carrier concentration may exponentially decrease at low temperatures (e.g., a silicon-based MEMS device). At cryogenic temperatures, the MEMS device may stop working since most of the charge carriers have been evacuated. Some implementations of the cryogenically integrated scanner may circumvent this issue by coating a significant portion of the device (not just the mirror portion) with a metal such that there are enough charge carriers to actuate the mirror.

Since the optical fiber may traverse through different temperature states, the cryogenically integrated scanner may perform polarization maintenance across a temperature gradient.

The cryogenically integrated scanner may perform spatial and spectral multiplexing. Numerous color centers per diffraction limited spot may be addressed (e.g., through use of a narrow linewidth laser and strain difference between the color centers which lead to a difference in resonant frequency that is greater than the narrow linewidth). The cryogenically integrated scanner may also multiplex by using multiple laser beams in a single assembly as well for speed (such as in LiDAR systems with a spinning head and 16, 32, 64 "lines").

The following is a non-exhaustive list of possible scanning elements used in the cryogenically integrated scanner: Spatial Light Modulator (SLM), Digital Micromirror Device (DMD—same as DLP displays), Galvo, deformable mirror, or a fiber endoscopy type design with a 180 degree completely folded capability.

The cryogenically integrated scanner may us a monostatic or a bi-static design. In a monostatic design, optical excitation is provided from a first path or fiber, and the optics or other beam guiding structures (e.g., nanopillars) are designed to preferentially direct the light emitted from the diamond back towards the first fiber, where it is coupled and can be separated from the first path (used for optical excitation) by the use of a circulator or fiber splitter. In a bi-static design, optical excitation is provided from a first path or fiber, and the optics or other beam guiding structures (e.g., nanopillars) are designed to preferentially direct the light emitted from the diamond in another direction, where it is coupled into a second path or fiber. The first fiber may be used as the excitation path, to connect the on-resonant laser to the color center, while the second fiber may be used for the emission path, to connect the color center's emitted photon to the uplink (quantum) channel. In the mono-static design, depending on the frequency shifting method used, it is possible to frequency shift the excitation photon on excitation and emission with the same electro-optic modulator (EOM). In a bi-static design, a second EOM for the second fiber could be used, or the second fiber could feedback into the same EOM as the first fiber (e.g., with the use of a time-gated switch to accept light from the laser side or the emitted side). A bi-static design may eliminate splitter loss on the input and output, compared to a monostatic design, which may use a splitter because the emitted photon from a color center doesn't go back to laser, but may instead be diverted to an uplink channel. For both a monostatic and a bi-static design, the emitted light be coupled to an uplink channel, which would be a quantum channel. It could be sent to a beam splitter to interfere with another photon from another node, a photon arriving from a space satellite source, or anywhere else in the world (e.g., another quantum repeater node).

The cryogenically integrated scanner may use a calibration procedure to generate a lookup table of frequencies at given locations (e.g., at cryogenic temperatures, scanning across the field of view and testing each site (pillar and/or diffraction limited spot) that fluoresces. Each site can be found by exciting each diffraction limited spot or pillar, using an off resonant laser that has higher energy (e.g., 532 nm) than the color center wavelength (e.g., 737 nm). A site that fluoresces indicates that there is one or more color centers in that location. Next, a photoluminescence excitation measurement can be performed by scanning a low linewidth resonant laser around the resonant wavelength region (e.g., 737 nm), all the resonant lines can be located (e.g., one per color center). Spectral lines due to other transitions can be discarded. The end result is that for each location the lookup table will have one or more resonant frequencies for the color centers. If no color center is found, or if two of the lines are two close together (e.g., within the linewidth of the laser) or there is some issue (e.g., low photon count rate from that spot or pillar), the cryogenically integrated system may be designed to not address the spot in operation. SiVs have can a linewidth of around 150-200 MHZ. For on-resonant excitation, the cryogenically integrated scanner may use a laser that has a linewidth of about 100 KHz.

The aforementioned calibration describes how to find the resonant frequencies at each location-pillar or diffraction limited spot. Each spot is mapped to specific x, y positions which correspond to a specific drive signal sent to the scanning element (e.g. MEMS). To generate the coordinate system, an additional calibration procedure can be done initially, or every so often, if needed, as things go in and out of alignment due to thermal effects, vibration, or otherwise. This map generating calibration routine can use the fact that the lithographically patterned fiducials may have a very precise location relative to the addressable color centers, since these will have errors on the order of the machine tolerance of the electron beam lithography write tool (<100 nm).

The diamond chip may have three or more fiducials (since three points define a plane). Specifically, there may be four fiducials in all four corners, not of the diamond chip, but of the field of view. To run the map generation routine, the scan area will be expanded. Under normal operation, the scan area is just enough to cover all of the addressable color centers. In this routine, the scan area will be greater than that during normal operation, to ensure that the scanning element scans over the fiducials. Once the scanning element has completed its scan over a larger area, it now has the relevant drive signals (to the scanning element), or equivalently the x,y position of the fiducials, and thus of all the addressable color centers (since the relative distance between fiducials is known). The fiducials are pillars or other nanostructures encoded with a unique pattern (e.g. like a QR code). To image, for example, the pillars, then the on-resonant laser will pick up a topographic surface map while scanning over the peaks and valleys of the "QR code".

The cryogenically integrated scanner may have performance that drops off due to the diffraction limited spot size increasing across the FOV, especially for faster/higher NA systems. Part of the problem is because the focal plane is not flat. Fiber collection efficiency may also decrease, but focusing on aforementioned problem of spot size, one possible correction is to place multiple diamond chip (lets) at slight angles relative to each other to form a slightly curved focal plane. Such a design may be especially beneficial when build a scanning system that has FOV performance over multiple diamond chips.

The cryogenically integrated scanner may also include a microwave strip line to control one or more of the color center's electron, a color center's nuclear spin, or a color center's neighboring carbon nuclear spin. For example, the microwave strip line can be a ~ 50 um copper wire connected to an RF generator (that sits external to the "housing") to send pi/2, pi, or other pulses to manipulate the spin state (rotations on the Bloch sphere). This microwave strip line could control the spin of all the color centers simultaneously. There are also many other methods of control that don't include a single microwave line (e.g., focused acoustic waves, other types of focused electromagnetic waves). A CMOS chip that is aligned and possibly bonded to the diamond chip, on the backside, could be used to send focused microwave signals to each of the pillars/color centers. Furthermore, a solid-state chip that has acoustic emitters (like a micromechanical device) could be used to focus acoustic waves onto the pillars or color centers.

The cryogenically integrated scanner can be used to distribute entanglement (e.g., single and dual time-bin, frequency-bin) between two quantum memories (e.g., two color centers). Single time-bin entanglement between two quantum memories can be generated using the following procedure: (1) To each quantum memory, apply a pi/2 microwave pulse to generate a coherent and substantially equal superposition of the two quantum states, (2) to each quantum memory, excite the respective color center using an on-resonance laser (depending on the spin, the color center's electron will either be excited and then emit a photon, or it will not be excited and no photon will be emitted. (3) interfere the two photonic channels (e.g., with a beam splitter) to erase which-path information, (4) measure the outputs of the beam splitter (e.g., using a photodetector). In the case of a single time-bin, if either two click or zero clicks are measured, the attempt is regarded as failed and is discarded. If one click is measured, the two quantum memories are entangled.

Dual time-bin entanglement between two quantum memories can be generated using the following procedure: (1) apply a microwave pi/2 pulse to the color center, (2) perform laser excitation, followed by photon emission, (3) apply a microwave pi pulse to flip the qubit's state, (4) again perform laser excitation, followed by photon emission, (5) interfere the two photonic channels (e.g., with a beam splitter) to erase which-path information, (6) measure the outputs of the beam splitter (e.g., using a photodetector). In contrast to the single time-bin basis for entanglement, the criteria for a successful entanglement using the dual time-bin entanglement is a single click in both time bins. This can be advantageous compared to the single time-bin version, because in the single time-bin basis there is chance that a no click scenario is registered as a one click scenario due to detector dark counts. Such an event is less likely in the dual rail time basis. An alternative entanglement basis may use the polarization of the light, in conjunction with polarization-sensitive transitions of the qubit, where the entanglement criteria is related to the detected polarization state of the detected light (e.g., clockwise or counter-clockwise circular polarization).

Frequency shifting, for the purposes of creating indistinguishable photons for entanglement purposes, can be accomplished in several ways. In one example, sideband modulation with an amplitude modulator (e.g., at RF frequencies) may shift an input beam to be on-resonance with a color center. The emitted photon could then be reverse frequency shifted weighted by a probability that is determined the amount of power in that band. In another example, serrodyne modulation with an EOM/phase modulator can be performed. An increasing portion of a voltage ramp (e.g., linear in speed) can be applied to the EOM, producing a phase shift proportional to the voltage. The EOM then produces a shift in the frequency of the light it is modulating, with the shift equal to the time derivative of the accumulated phase. The duration of the increasing portion of the ramp can be made to be equal to the characteristic lifetime of the color center being addressed, after which a decreasing portion of a voltage ramp can be applied to perform an equal but opposite phase shift and corresponding frequency shift. Using this ramp, it is possible to shift a beam into resonance with a color center, and then shift the photon emitted from the color center back to the original laser frequency that was used as input to the EOM. The applied voltage waveform would then be a sawtooth. Additionally, each addressable color center could be synced with the waveform generator such that there are possibly unique voltage ramps for each color center, which can each have their own unique resonant frequency due to the local strain fields.

FIG. 1 shows an example quantum state scanning system 100 configured to interact with a plurality of quantum states over a respective series of time intervals in a scanning period. Light enters a housing 102 (e.g., providing a cryogenic environment) through an optical fiber interface 104 that is optically coupled to an optical fiber 105. In some examples, at least a portion of the optical fiber interface 104 extends outside of the interior of the housing 102. An array of QSEEs 106 (e.g., color centers in a diamond, silicon, or silicon carbide sample) is configured to be housed on or inside the housing 102, with each of the QSEE configured to provide a quantum state. The array of QSEEs 106 is coupled to the optical fiber interface 104, at least in part through the use of one or more directional structures 108. Each of multiple portions of the one or more directional structures 108 is configured to provide a preferential direction for a respective element-coupled optical mode that controls optical coupling to and from a different respective subset of one or more of the QSEEs in the array of QSEEs 106. The one or more directional structures 108 may comprise an array of pillars formed in a material that comprises the QSEEs, or a hemispherical optically transmissive material configured to cover a plurality of the subsets of one or more QSEEs. The optical fiber interface 104 provides a fiber-coupled optical mode to a scanning structure 110 configured to be housed on or inside the housing 102. The scanning structure 110 can change an overlap between the fiber-coupled optical mode and a different respective one of the element-coupled optical modes over each time interval of the series of time intervals.

Referring again to FIG. 1, the scanning structure 110 may include various features for changing a propagation direction and/or mode size of the optical modes being coupled. In some examples, the scanning structure 110 may comprise a first scanning element (not shown) configured to translate the optical fiber interface 104 along a first axis. The scanning structure 110 may also comprise a second scanning element (not shown) configured to change the overlap between the fiber-coupled optical mode and different respective ones of the element-coupled optical modes associated with the directional structures 108 along a second axis substantially perpendicular to the first axis. The second scanning element may comprise a reflective surface configured to rotate about an axis that is substantially parallel to the first axis. Alternatively, in some implementations an electromechanical steering mechanism can be used to move and/or rotate the optical fiber about multiple axes with respect to the element-coupled optical mode. The light emitted from the QSEEs can be transmitted outside of the housing 102 via the optical fiber 105, and can be sent to an optical device 112. The optical device 112 (e.g., an electro-optic modulator) can connect to (or be integrated with) control equipment (e.g., to shift the frequency of the light in order to create substantially indistinguishable photons for entanglement generation). The optical device 112 may also connect to a satellite or otherwise transmit the optical mode from the optical fiber 105 to another location.

Figure 2:
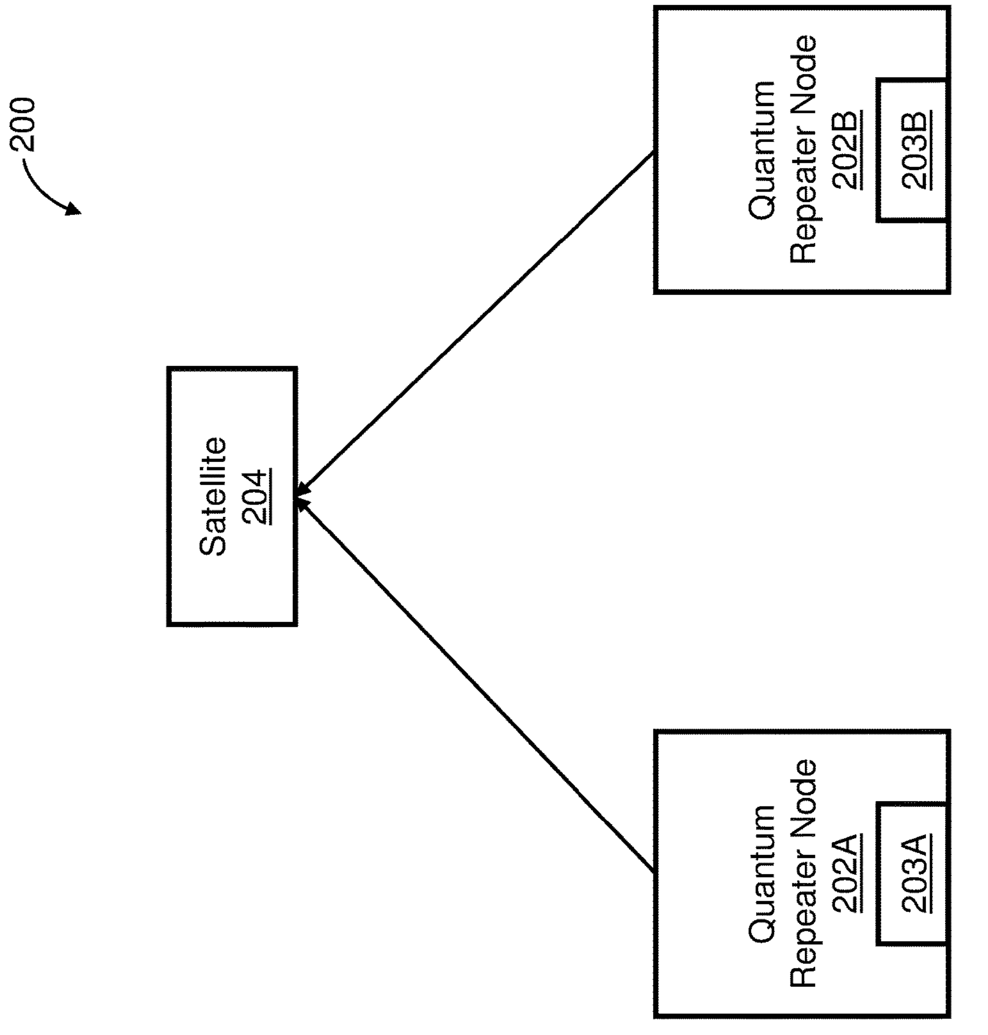
FIG. 2 is a schematic diagram of an example satellite uplink scheme.

FIG. 2 shows an example satellite uplink scheme 200. A first quantum repeater node 202A and a second quantum repeater node 202B (e.g., located at users Alice and Bob, respectively) transmit photons from a first array of QSEEs 203A and a second array of QSEEs 203B, respectively, to a satellite 204. At the satellite 204, photons from the first quantum repeater node 202A can interfere with photons from the second quantum repeater node 202B (e.g., by using a beam splitter) and may be subsequently detected (e.g., by using a photodiode), thus performing one or more entanglement operations that can result in entanglement between pairs comprising QSEEs from both the first array of QSEEs 203A and the second array of QSEEs 203B. Such entanglement operations can occur because the photons transmitted to the satellite 204 can be entangled with a quantum memory stored at each of the QSEEs.

Figure 3:
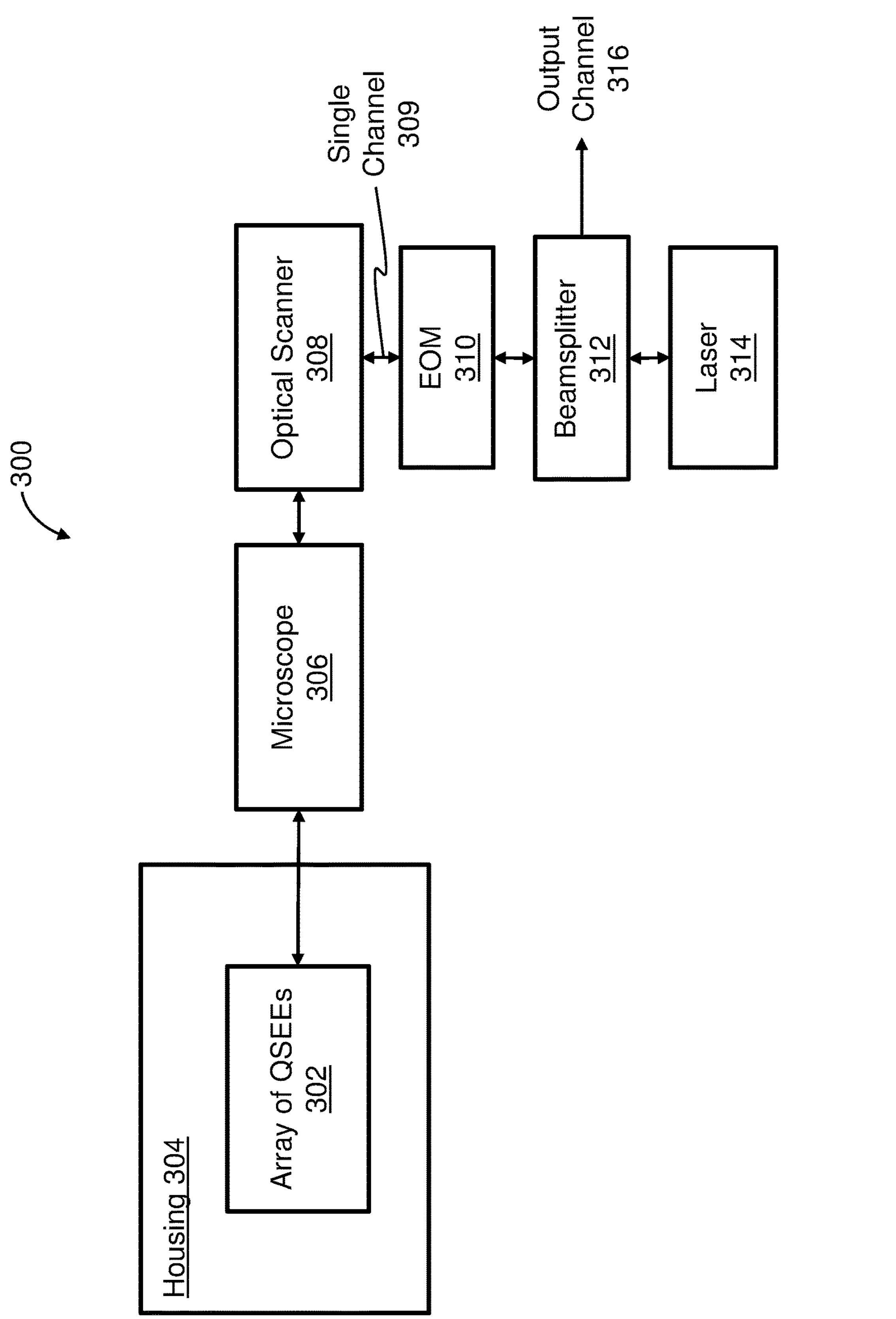
FIG. 3 is a schematic diagram of an example quantum repeater node.

FIG. 3 shows an example quantum repeater node 300 that may be used in an uplink scheme (e.g., to transmit photons to a satellite, as shown in FIG. 2). An array of QSEEs 302 (e.g., SiV or NV color centers in a diamond sample that are used as a quantum memory) are configured as memory qubits within a housing 304 (e.g., a dilution refrigerator or a cryostat). The array of QSEEs 302 may be located in the focal plane of a microscope 306 (e.g., a confocal optical microscope), which can be located partially or entirely outside of the housing 304. The microscope 306 may optically access the quantum memory 302 through a window (not shown) in the housing 304, for example. An optical scanner 308 (e.g., a galvanometer mirror, a MEMS mirror, or a piezo-scanning mirror) can scan an optical mode transmitted through the microscope 306 across the various optical modes of the spatially distinct QSEEs, or clusters of two or more QSEEs, thereby multiplexing the optical signal from various QSEE locations to a single optical channel 309. The single optical channel 309 is optically coupled to an EOM 310 that can be configured to provide a frequency shift between the zero-phonon line (ZPL) frequency of a QSEE and the carrier frequency of at least one of (1) light transmitted through a beam splitter 312 and generated by a laser 314 or (2) an output channel 316 that may be optically coupled to a satellite (not shown) or an optical fiber (not shown). The frequency shift provided by the EOM 310 may shift the frequency of the photons emitted by the QSEEs to a single frequency so as to provide indistinguishability at the output channel 316 that can then be used for entanglement generation. In some examples, the laser 314 may be tuned to the carrier frequency of the output channel 316.

Figure 4:
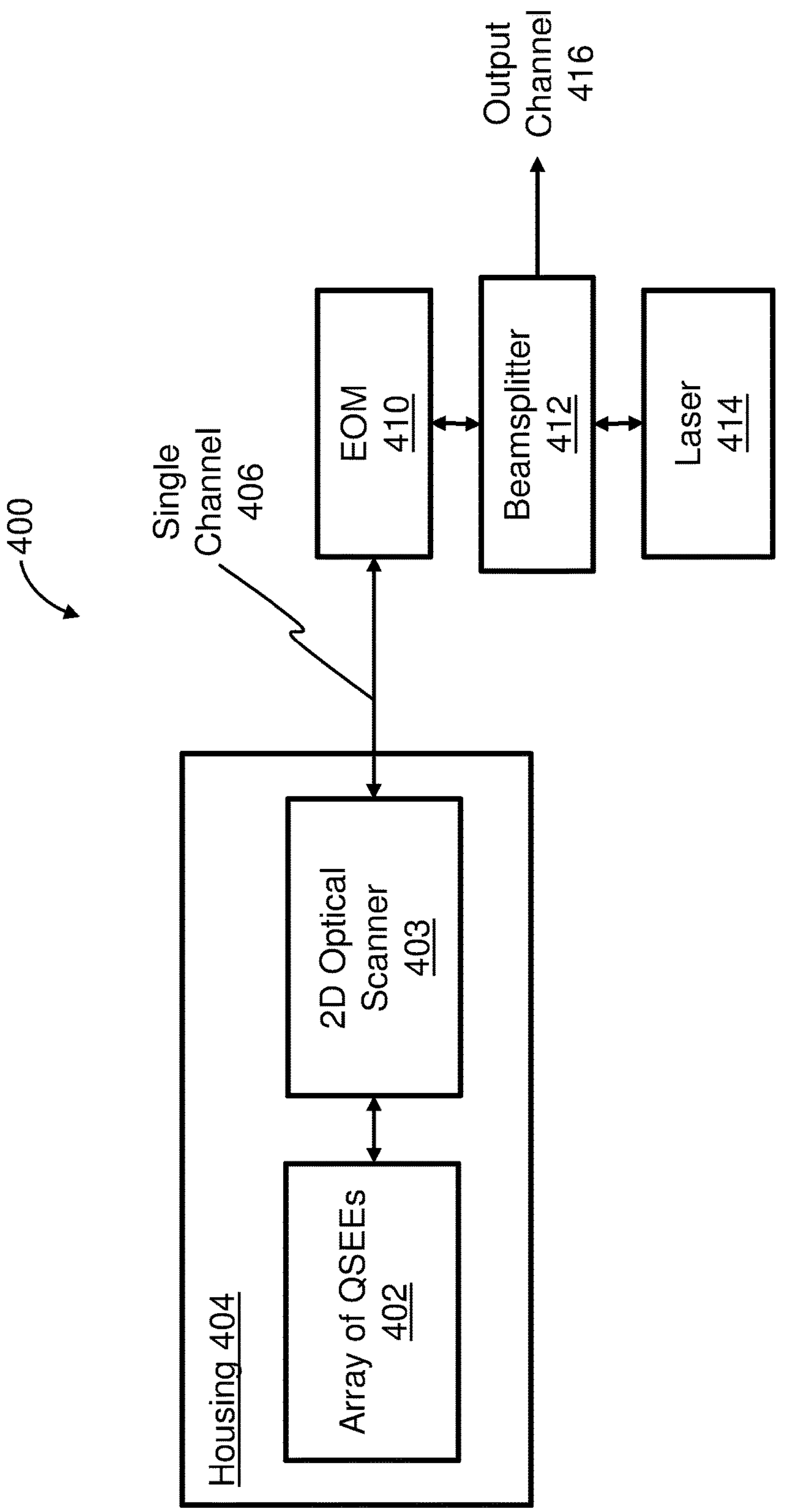
FIG. 4 is a schematic diagram of an example quantum repeater node.

FIG. 4 shows an example quantum repeater node 400 that may be used in an uplink scheme. An array of QSEEs 402 is located in the focal plane of a 2D optical scanner 403 located within a housing 404 (e.g., dilution fridge). In this example, the 2D optical scanner 403 multiplexes the optical signals from various spatially distinct QSEEs or clusters of QSEEs to a single channel 406 that is optically coupled (e.g., by a fiber interface) to an EOM 410 that can provide a frequency shift to light propagating in the single channel 406. A beam splitter 412 is positioned between a laser 414 and the EOM 410, and an output channel 416 is optically coupled to the single channel 406 and the laser 414 through the beam splitter 412. In some examples, the beam splitter 412 and the laser 414 may be co-integrated on a photonic integrated circuit. Furthermore, the array of QSEEs 402 and the 2D optical scanner 403 may be assembled together in an integrated assembly.

Figure 5:
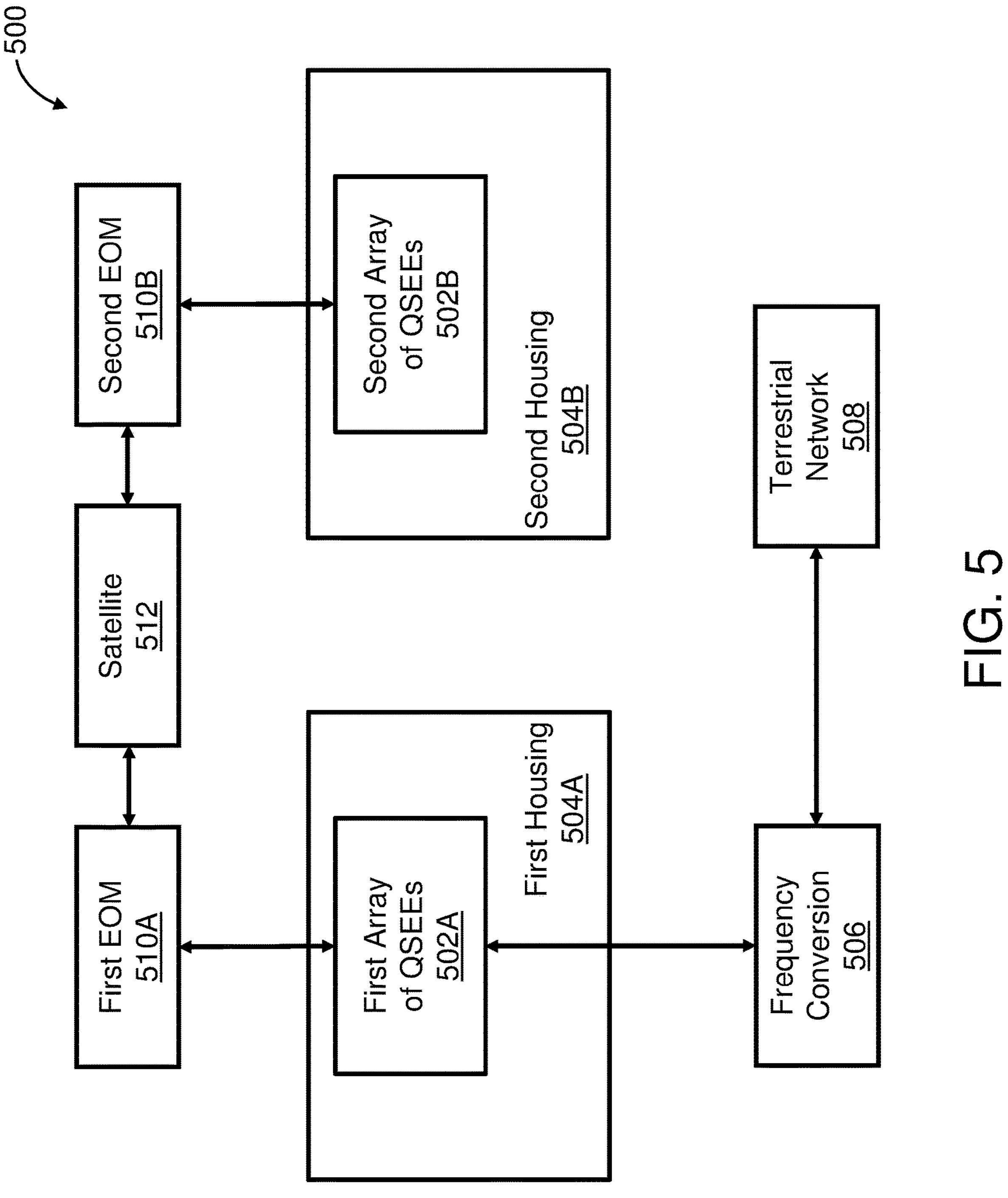
FIG. 5 is a schematic diagram of an example satellite uplink scheme.

FIG. 5 shows an example satellite uplink scheme 500. A first array of QSEEs 502A and a second array of QSEEs 502B are respectively located within a first housing 504A and a second housing 504B (e.g., dilution refrigerators). One or more QSEEs from the first array of QSEEs 502A are to be remotely entangled with one or more QSEEs from the second array of QSEEs 502B. In some examples, photonic nanostructures in the form of diamond nanopillars may be etched into diamond, and each nanopillar may contain a color center or a cluster of color centers that are configured to be used as QSEEs. In such examples, the nanopillars can direct the quantum emission from each QSEE into a well-defined optical mode along the waveguiding axis of the nanopillar. The first array of QSEEs 502 is optically coupled to a frequency conversion element 506 that shift an optical signal provided by a terrestrial network 508. The optical signals of single photons emitted by the QSEEs in the first array of QSEEs 502A and the optical signals of single photons emitted by the QSEEs in the second array of QSEEs 502B are respectively optically coupled to a first EOM 510A and a second EOM 510B each configured to provide a frequency shift to the optical signals for photon indistinguishability and entanglement. Free-space optics may be used to couple the single photons emitted by the QSEEs to a satellite 512, where photons from the first EOM 510A can be interfered with photons from the second EOM 510B, thus constituting an entangling operation. The terrestrial network 508 may also be in communication with other terrestrial networks.

Figure 6A:
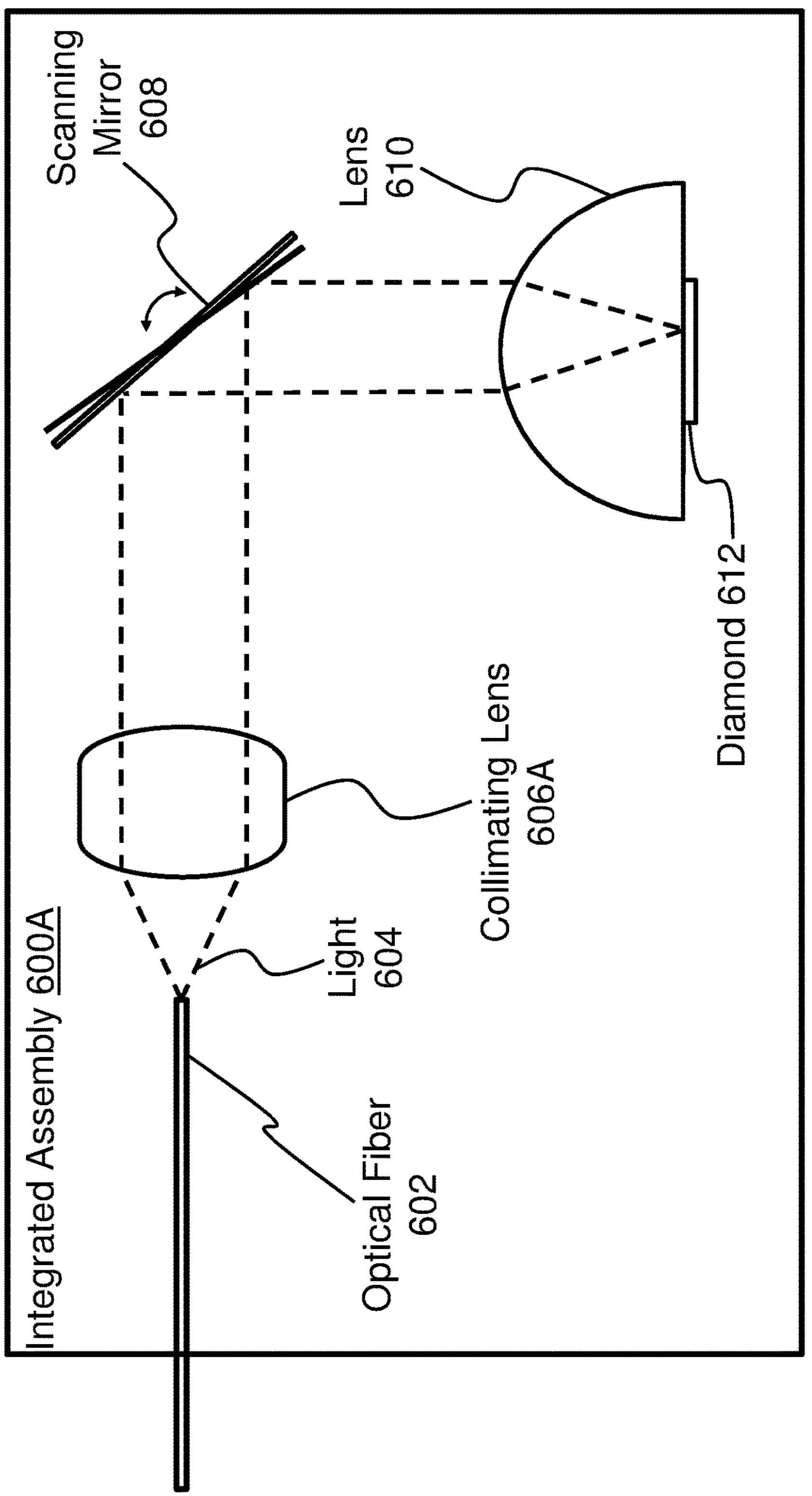
FIG. 6A is a schematic diagram of an example integrated assembly.

FIG. 6A shows an example integrated assembly 600A (e.g., for performing 2D optical scanning). An optical fiber 602 outputs light 604 that is collimated by collimating lens 606A (e.g., a lens or a stack of lenses). After collimation, the light 604 is directed to a scanning mirror 608 (e.g., a 2D MEMs mirror). The scanning mirror 608 scans the light 604 across a lens 610 (e.g., a HyperSIL). A diamond 612 comprising color centers is positioned (e.g., via bonding or clamping) to the back side of the lens 610, which may coincide with the focal plane of the lens 610. The diamond 612 may be heat sunk to a cold finger of a cryostat (not shown), which can be less than 4 Kelvin, 1 Kelvin, or less than 100 milli-Kelvin, depending on the applications and experimental constraints. As the scanning mirror 608 scans the angle of the beam formed from the light 604, the focal spot scans over the diamond 612, thus providing spatial multiplexing of the single photon signals from the color centers of the diamond 612 to the optical fiber 602. Laser excitation (e.g., from light provided by a laser optically coupled to the optical fiber 602) and quantum emission from the color centers of the diamond 612 are directed along the same optical path, but in the forward and backward direction respectively. Although the incoming and outgoing light onto the scanning mirror 608 is depicted to be near right-angles in this example (i.e., approximately a 45-degree angle of incidence with respect to the normal direction of the mirror's plane), other incidence angles are also possible, and in particular, lower angles of incidence may be advantageous as they can more fully utilize the surface area of the scanning mirror 608. For example, for a scanning mirror 608 configured at a 22.5-degree angle of incidence, the scanning mirror 608 presents a larger cross section to the light 604 than for a 45-degree angle of incidence. Another consideration is the placement of the scanning mirror 608 relative to the lens 610. In some examples, the scanning mirror 608 can be located a focal distance away from the lens 610. At this distance, when the scanning mirror 608 scans the optical mode of the light 604 through an angular range, the lens 610 refracts the light 604 into a cone that is normally incident on the surface of the diamond 612. If the scanning mirror 608 is not a focal distance away from the lens 610, the cone may be tilted as the scanning mirror 608 scans through an angular range, which may be non-ideal.

Figure 6B:
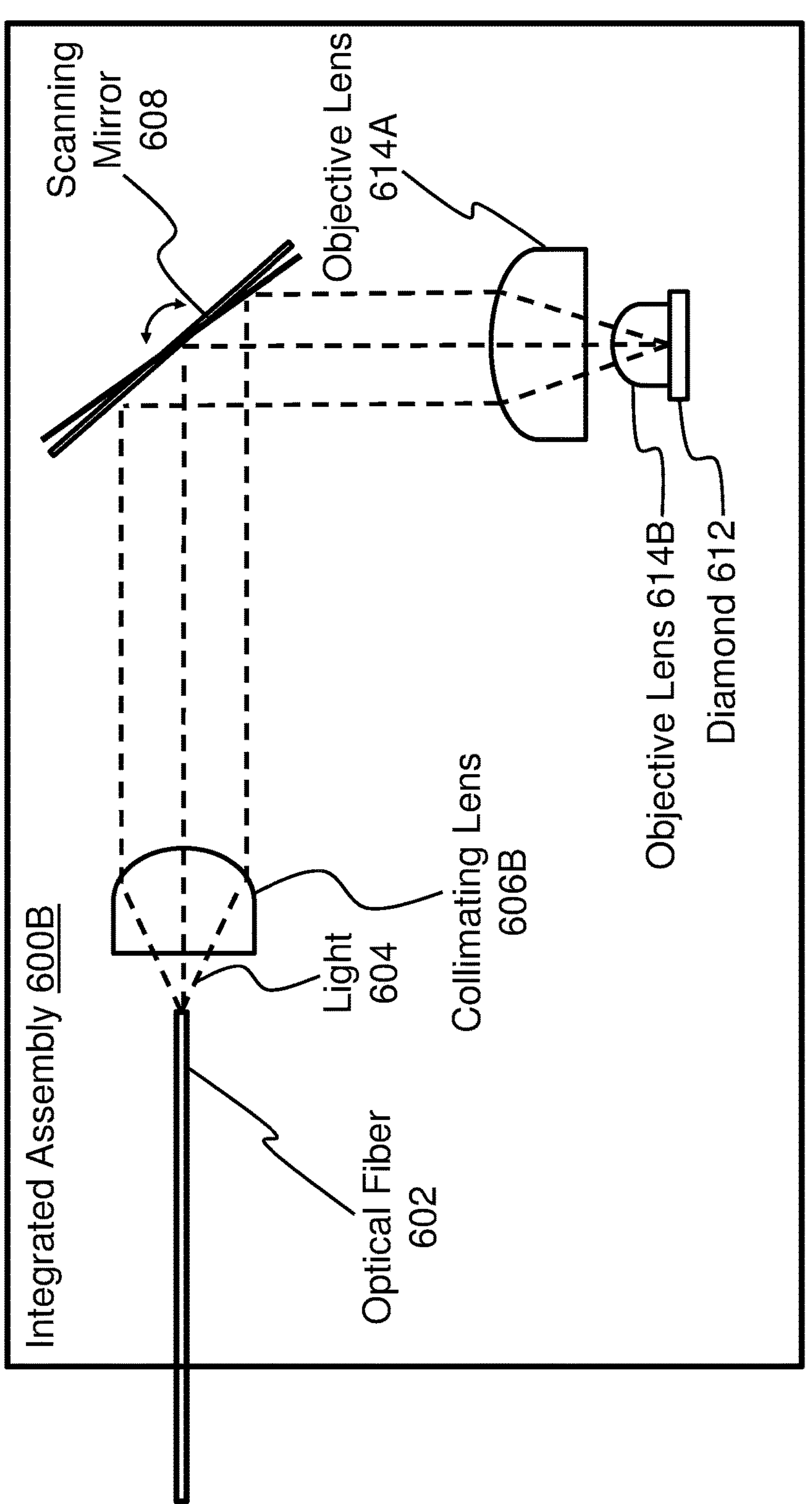
FIG. 6B is a schematic diagram of an example integrated assembly.

FIG. 6B shows an example integrated assembly 600B. Laser light from an optical fiber 602 (e.g., with a numerical aperture of 0.2) is collimated by a collimating lens 606B and the collimated light is redirected by a scanning mirror 608 to a first objective lens 614A and a second objective lens 614B that collectively focus the collimated light onto color centers of a diamond 612. The first objective lens 614A (e.g., a spherical convex/plano lens with a diameter of 1 mm) partially focuses the light, and the second objective lens 614B (e.g., a HyperSIL spherical/plano lens) focuses the light to just outside the planar back surface of the second objective lens 614B, where the diamond 612 is bonded, clamped, or otherwise attached to the surface. Thus, the color centers of the diamond 612 can be located in the focus formed by the two objective lenses. Single-photon emission from color centers can occur at the focal point of the two objective lenses and be collected by the two objective lenses and directed back along the same path to the optical fiber 602.

Figure 6C:
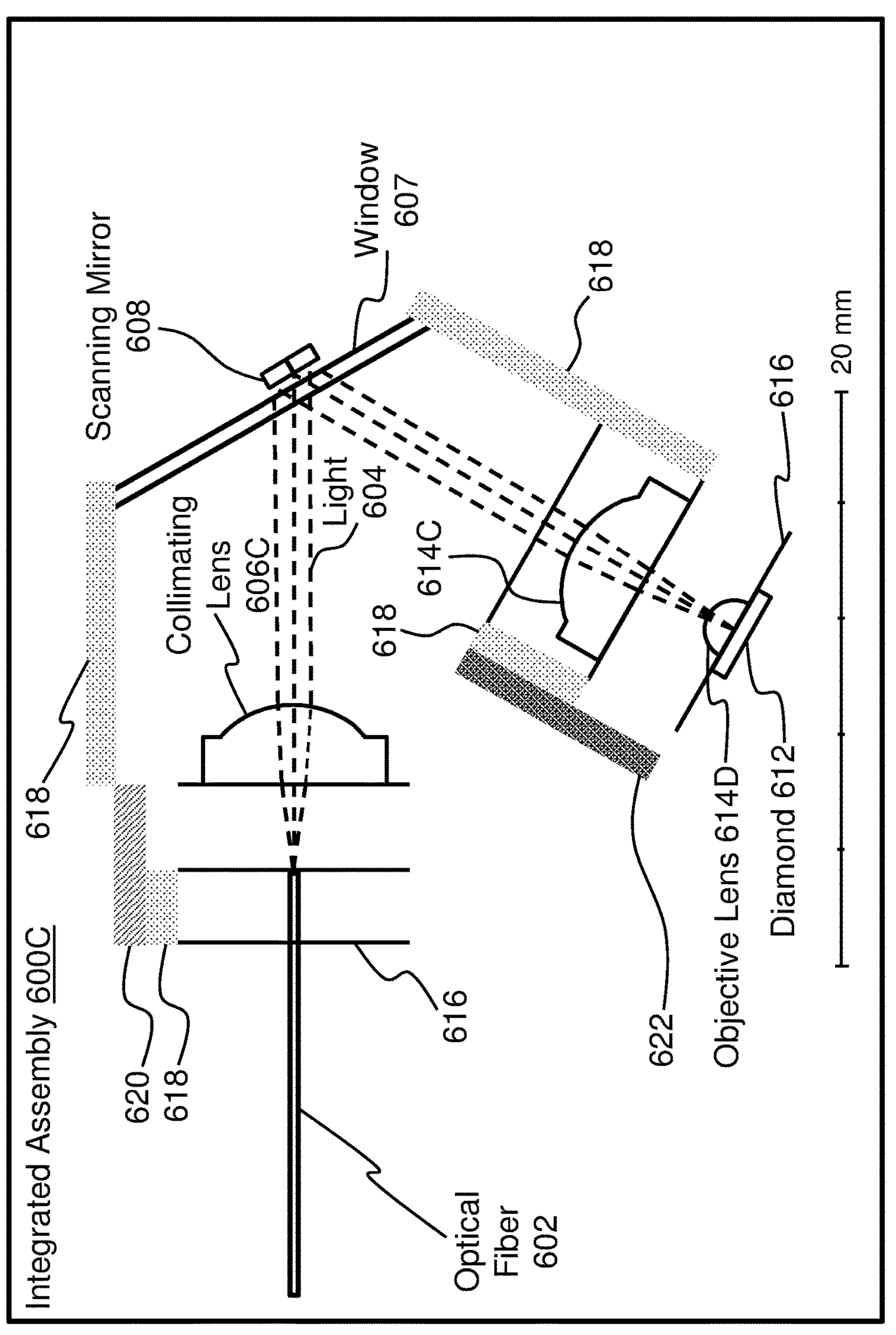
FIG. 6C is a schematic diagram of an example integrated assembly.

FIG. 6C shows an example integrated assembly 600C. In this example, metering references 616 denote different sections of a differential metering stack comprising a first material 618, a second material 620, and a third material 622. The differential metering stack can be used to maintain optical alignment, for example, by reducing changes to the focus of light 604 on a diamond 612 when the integrated assembly 600C is cooled to cryogenic temperatures. In some examples, the first material 618 is invar (with a coefficient of thermal expansion (CTE) of 1.26E-6 per 1 K), the second material 620 is Ti64 (with a CTE of 8.8E-6 per 1 K), and the third material 622 is Mo (with a CTE of 5E-6 per 1 K). In general, the three materials, their locations, and their lengths can be chosen so as to result in an integrated assembly 600C that is substantially athermal. In some examples, athermal designs may engineered such that after a change in temperature to the integrated assembly 600C, the change in the path length of the light 604 between a focal point and a lens is substantially similar to the change in the focus of the lens. The light 604 emitted from an optical fiber 602 (e.g., with a numerical aperture of 0.12) is collimated by a collimating lens 606C and the collimated light traverses through a window 607 and is redirected by a scanning mirror 608 to a first objective lens 614C and a second objective lens 614D (e.g., a solid immersion lens (SIL)) that collectively focus the collimated light onto color centers of a diamond 612.

Figure 7:
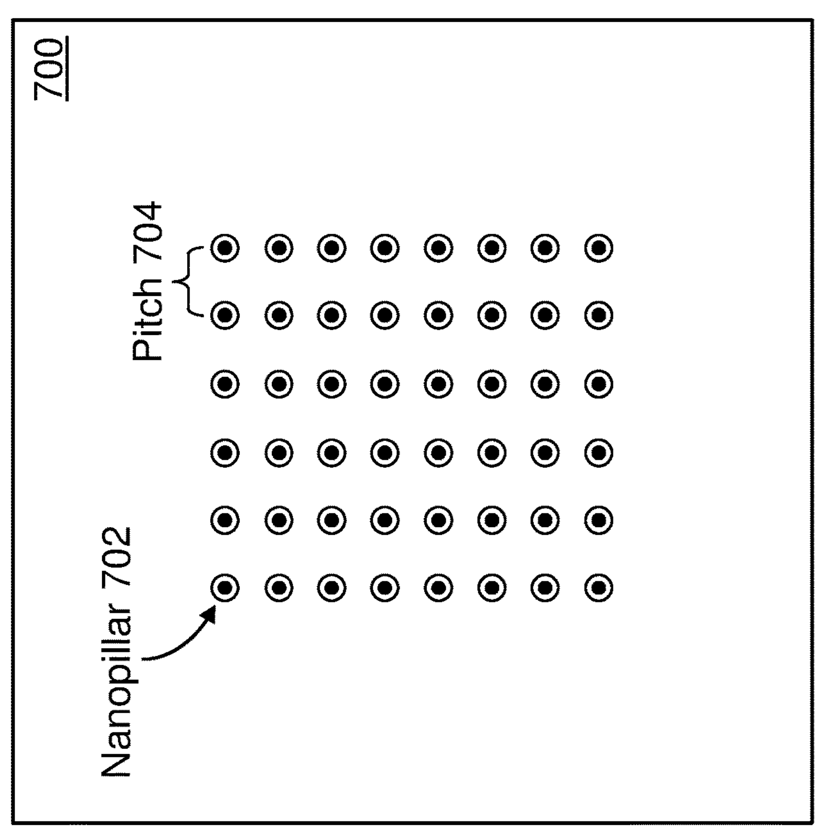
FIG. 7 is schematic diagram of an example array of diamond pillars containing color centers.

FIG. 7 shows an example array of diamond nanopillars 700 comprising nanopillars 702 fabricated from diamond that contains color centers. The nanopillars 702 can be fabricated by standard nanolithographic and plasma etching techniques. The nanopillars 702 may have various geometries, including cylindrical, tapered, conical, parabolic, or other geometries where the distal tip of the nanopillars 702, where the color center of each nanopillar 702 is located, has an approximate diameter of approximately 200 to 400 nm. The nanopillars 702 may have a numerical aperture of approximately 0.4 in some examples. The center-to-center pitch 704 between the nanopillars 702 can be approximately 1 to 3 μm, such that approximately 1000 nanopillars 702 can be contained in an approximately 30 μm×30 μm region of diamond, or approximately 1 million nanopillars 702 can be contained in an approximately 1 mm×1 mm region of diamond. The nanopillars 702 may be arranged in a regular array, such as a square grid, hexagonal grid, or other regular pattern, or in non-regular patterns (i.e., non-repeating patterns). The locations and sizes of the nanopillars 702 can be specified during the nanolithographic step. In some examples, the size and spacing of the nanopillars 702 may be chosen to form a foveated pattern to compensate for degradation in the spot size at the edges of the field of view of the scanning system. In some examples, the nanopillars 702 may be positioned to coincide with the location of pre-characterized color centers in the diamond.

Figure 8:
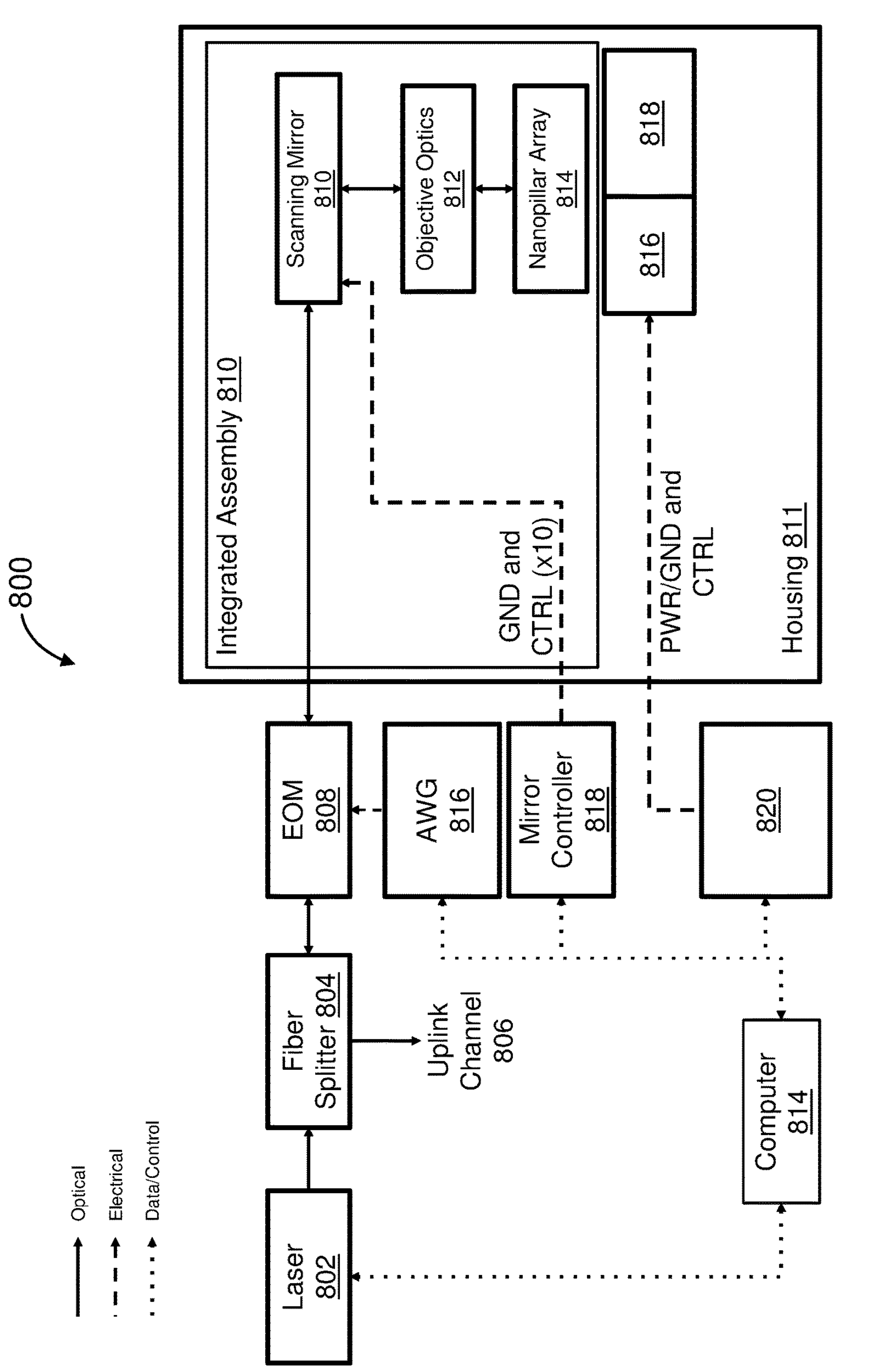
FIG. 8 is a schematic diagram of an example quantum repeater node.

FIG. 8 shows an example quantum repeater node 800 that may be used in an uplink scheme. Light emitted by a laser 802 is split (e.g., with a splitting ratio of 90/10) by a fiber splitter 804. In some examples, 90% of the light is transmitted to an uplink channel 806 and 10% is transmitted to an EOM 808 that is optically coupled, possibly indirectly, such as by a fiber and a collimation element, to a scanning mirror 810 located within a housing 811. The scanning mirror 810 is optically coupled to objective optics 812 that transmit the light to a nanopillar array 814. Magnetic field coils 816 and microwave antennas 818 are located in proximity to the nanopillar array 814. A computer 820 is configured to control the laser 802, an AWG 816 (arbitrary waveform generator) that controls the EOM 808, a mirror controller 818 that controls the scanning mirror 810, and a magnet and microwave controller 820 that controls the magnetic field coils 816 and the microwave antennas 818. The MEMs scanner is controlled by a MEMs controller, located outside the dilution refrigerator, and connected to the MEMs scanner via electrical cables. The amount of the frequency shift imparted by the EOM 808 to the laser light is controlled by the AWG 816. The AWG 816, the mirror controller 818, and the magnetic and microwave controller 820 can all be synchronized by a common clock to ensure that the QSEE across the nanopillar array 814 can be addressed by control signals (e.g., microwave and optical signals) having the desired, pre-characterized frequencies, and that single photons emitted by the color centers, through the nanopillars of the nanopillar array 814, can all be spectrally multiplexed to a common carrier frequency to ensure photon indistinguishability. The fiber splitter 804 reflects and transmits a portion of the incident light from the laser 802 and directs indistinguishable single photon emission into the uplink channel 806.

Figure 9B:
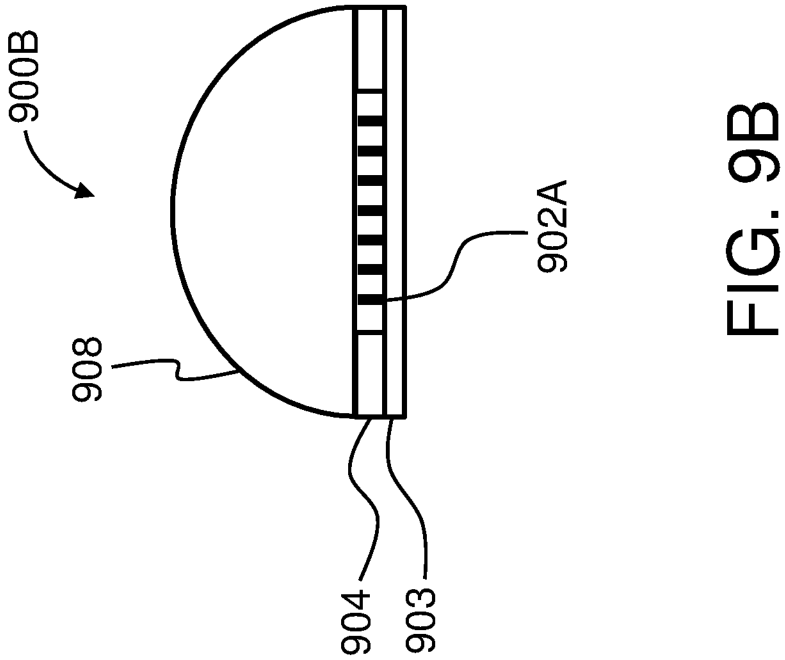
FIG. 9B is a schematic diagram of a cross-section of an example diamond-SIL configuration.
Figure 9A:
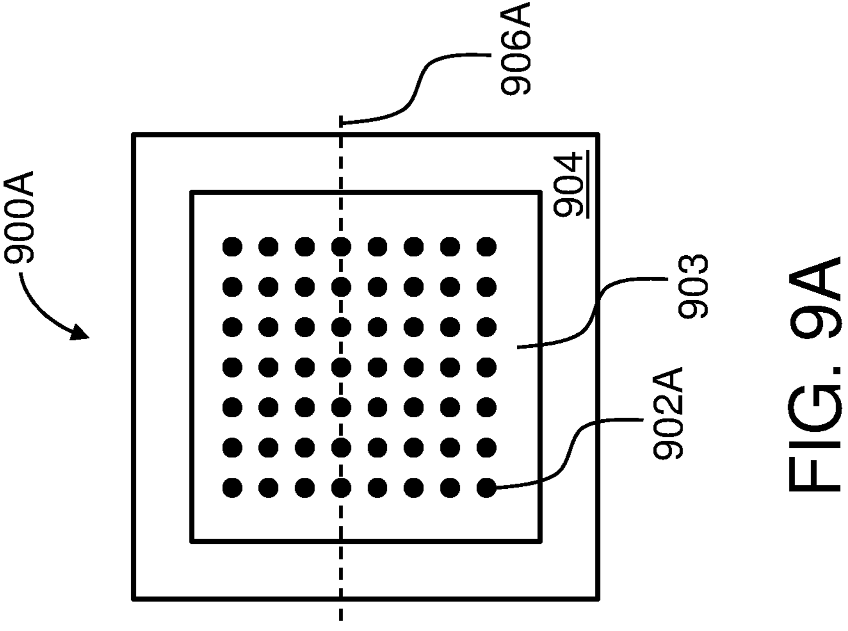
FIG. 9A is a schematic diagram of an example patterned diamond.

FIG. 9A shows an example patterned diamond 900A, as viewed from above. An array of pillars 902A, a recessed region 903, and a ledge 904 are patterned (e.g., by lithographic techniques) in a diamond. A first dashed line 906A denotes a cross-section (i.e., plane) formed out of the page. The pillars can be formed by removing an annulus of diamond material around each pillar. The diamond material outside the annulus remains, and is of equal height to the pillar, the heights of both being equal to the original, unpatterned diamond height. In this example, the annuli around each pillar overlap, such that diamond material is fully removed outside of the pillar array 902A, except to form the ledge 904 that may be formed by using an electron beam with a size equal to or smaller than the area of the recessed region 903. The array of pillars 902A and the ledge 904 may be used as a support structure for a SIL (not shown), so that the pressure applied in bringing the pillars into contact with the SIL is distributed over a larger area.

FIG. 9B shows a cross-section of an example diamond-SIL configuration 900B, as viewed through a plane denoted by the first dashed line 906A of FIG. 9A. A SIL 908 is attached to at least one of an array of pillars 902A or a ledge 904. The SIL 908 may be used to reduce the reflection of light from the end of each pillar in the array of pillars 902A, which may otherwise be significant when the pillar is terminated in air due to an index mismatch. In order to reduce this reflection, the end of each pillar may be placed within 100 nm of the flat surface of the SIL 908, or in direct contact with the SIL 908, depending on other design constraints. In some examples, the SIL 908 is a half ball lens preloaded onto the final processed (i.e., patterned) diamond.

Figure 9D:
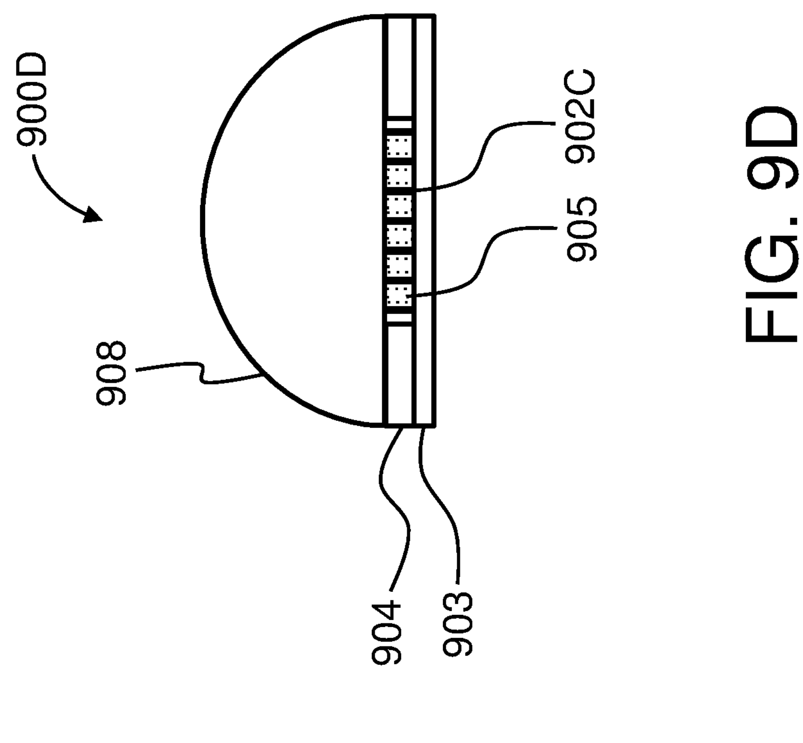
FIG. 9D is a schematic diagram of a cross-section of an example diamond-SIL configuration.
Figure 9C:
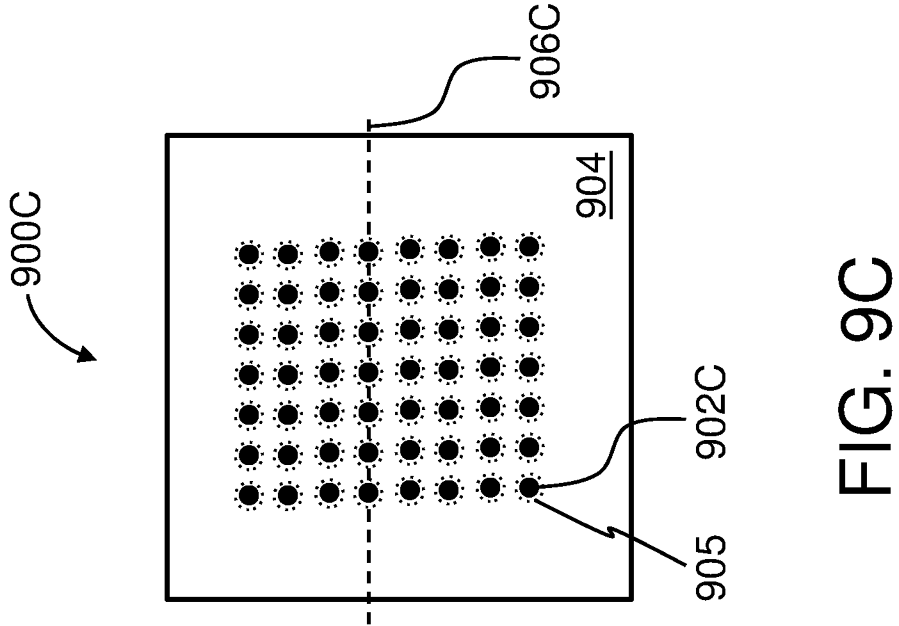
FIG. 9C is a schematic diagram of an example patterned diamond.

FIG. 9C shows an example patterned diamond 900C, as viewed from above. An array of pillars 902C, a ledge 904, and annular rings 905 are patterned (e.g., by lithographic techniques) in a diamond. A second dashed line 906C denotes a cross-section (i.e., plane) formed out of the page. The pillars can be formed by removing an annulus of diamond material around each pillar. The diamond material outside the annulus remains, and is of equal height to the pillar, the heights of both being equal to the original, unpatterned diamond height. In this example, the radius of each annulus is less than the spacing between pillars, so that there are annular rings 905 distributed throughout the array of pillars 902C. The array of pillars 902C, the ledge 904, and the annular rings 905 may be used as a support structure for a SIL (not shown), so that the pressure applied in bringing the pillars into contact with the SIL is distributed over a larger area.

FIG. 9D shows a cross-section of an example diamond-SIL configuration 900D, as viewed through a plane denoted by the second dashed line 906C of FIG. 9C. A SIL 908 is attached to at least one pillar in an array of pillars 902C, a ledge 904, or one or more annular rings 905. Although the ledge 904, the annular rings 905, and the array of pillars 902C are made of the same material (e.g., diamond), they are denoted by different colors and outlines for additional clarity.

Figure 9F:
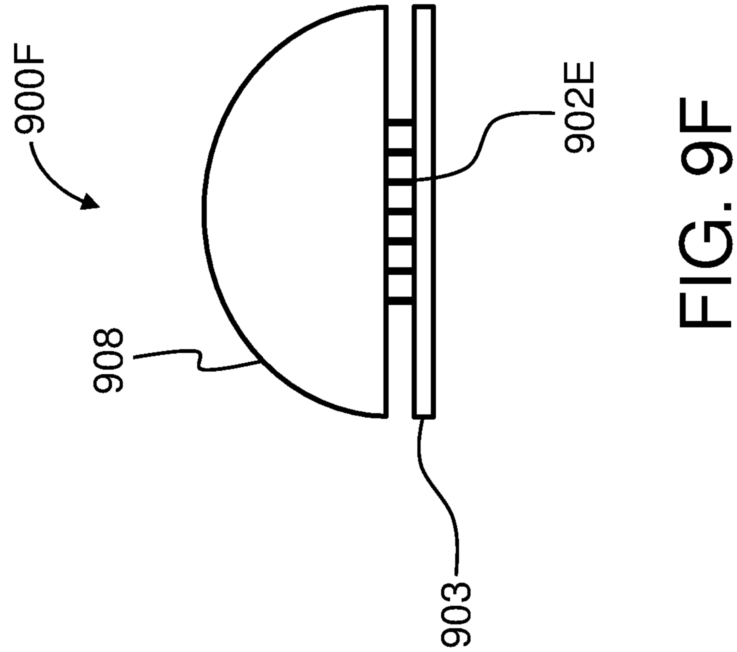
FIG. 9F is a schematic diagram of a cross-section of an example diamond-SIL configuration.
Figure 9E:
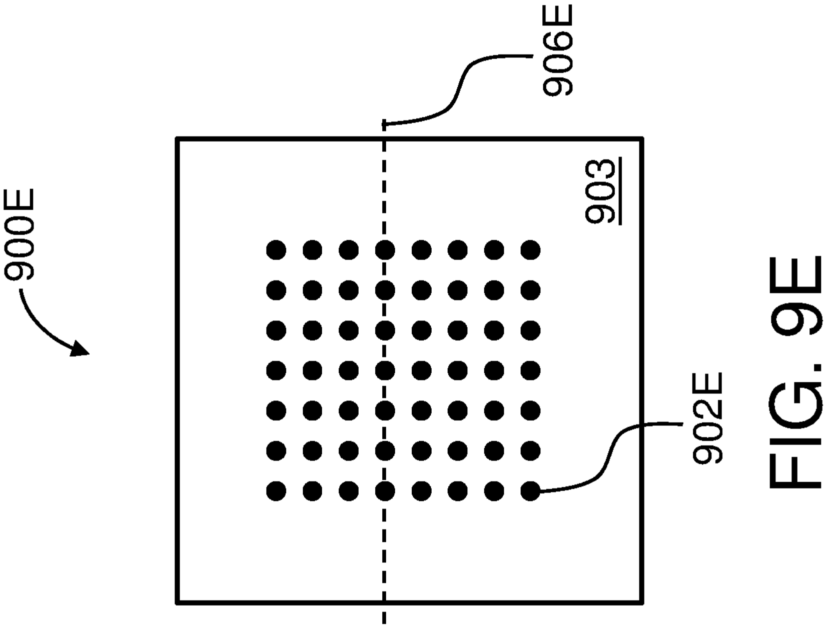
FIG. 9E is a schematic diagram of an example patterned diamond.

FIG. 9E shows an example patterned diamond 900E, as viewed from above. An array of pillars 902E and a recessed region 903 are patterned (e.g., by lithographic techniques) in a diamond. A third dashed line 906E denotes a cross-section (i.e., plane) formed out of the page. The array of pillars 902E may be used as a support structure for a SIL (not shown). In this example, supporting diamond structures that are not part of the array of pillars 902E are completely or partially removed, either by patterning an etch mask only where the pillars are to be formed and etching all of the diamond around that region in a single step, or by etching an annulus around each pillar in one etch step and etching away all or part of the supporting material in a subsequent step. Thus, the pressure applied on the pillars to bring them into contact with the SIL 908 may only be distributed over the pillars and not over any supporting material. Such an arrangement may have the advantage of reducing the likelihood that, in the case of an uneven diamond surface, the supporting material (that has been removed in this example) introduces an unwanted space (i.e., gap) between the ends of the pillars and the flat surface of the SIL 908.

FIG. 9F shows a cross-section of an example diamond-SIL configuration 900F, as viewed through a plane denoted by the third dashed line 906E of FIG. 9E. A SIL 908 is attached to at least one pillar in an array of pillars 902E.

Referring again to FIGS. 9A, 9B, 9C, 9D, 9E, and 9F, the diamond that is to be patterned may, in some examples, be a square of width and length given by 2 mm×2 mm or 4.5 mm×4.5 mm. The thickness of the diamond that is to be patterned may be 0.5 mm or less than 20 μm. However, the diamond thickness may be selected according to the desired arrangement with the SIL, so as to optimize properties such as the mechanical robustness, the transparency of the substrate, the optical interface with the SIL or multi-waveguide array, or the flexibility of the substrate. A flexible substrate may be achieved by reducing the diamond thickness until the substrate that supports the pillars is less than 2 μm in thickness. A flexible substrate may be advantageous for inverted pillar arrangements. The array of pillars may be 0.5 mm×0.5 mm in size, with each pillar having a diameter of approximately 150 to 500 nm and a height of 500 nm to 2 μm, and the array of pillars having a pitch of 1 to 5 μm. In general, the extent of the array of pillars may be chosen to be larger than the field of view of a confocal microscope, or in the case of a multi-waveguide array, more than the diameter of the multi-waveguide array. Various pillar geometries may be used, depending on the desired configuration relative to the SIL. The pillars may have a geometry that is cylindrical or that has an inward tapering, such that light is guided away from the bulk diamond substrate and towards the SIL. In the case of an inverted diamond substrate, where the pillars are on the distal side of the substrate from the SIL or multi-waveguide array, a pillar geometry may be selected where the pillars taper to larger diameters in going from the distal end towards the bulk diamond substrate. Paraboloidal geometries may also be used.

The pillars may be arranged in a regular array, either on a square grid spacing, a hexagonal grid spacing, or other regular array, or they may be arranged irregularly. An irregular arrangement may be advantageous in order to align the pillars to the position of color centers, whose lateral positions may be random. A smaller pillar-to-pillar pitch may result in a higher density of QSEEs in the array, which can be advantageous. However, the pitch between pillars may be designed to be large enough so as to leave enough air between the pillars at the distal end such that the pillars act primarily as independent waveguides, and the modes of one pillar do not significantly leak into the modes of a neighboring pillar.

Figures 10A, 10B, 10C, 10D, 10E, 10F, 10G, 10H, 10I:
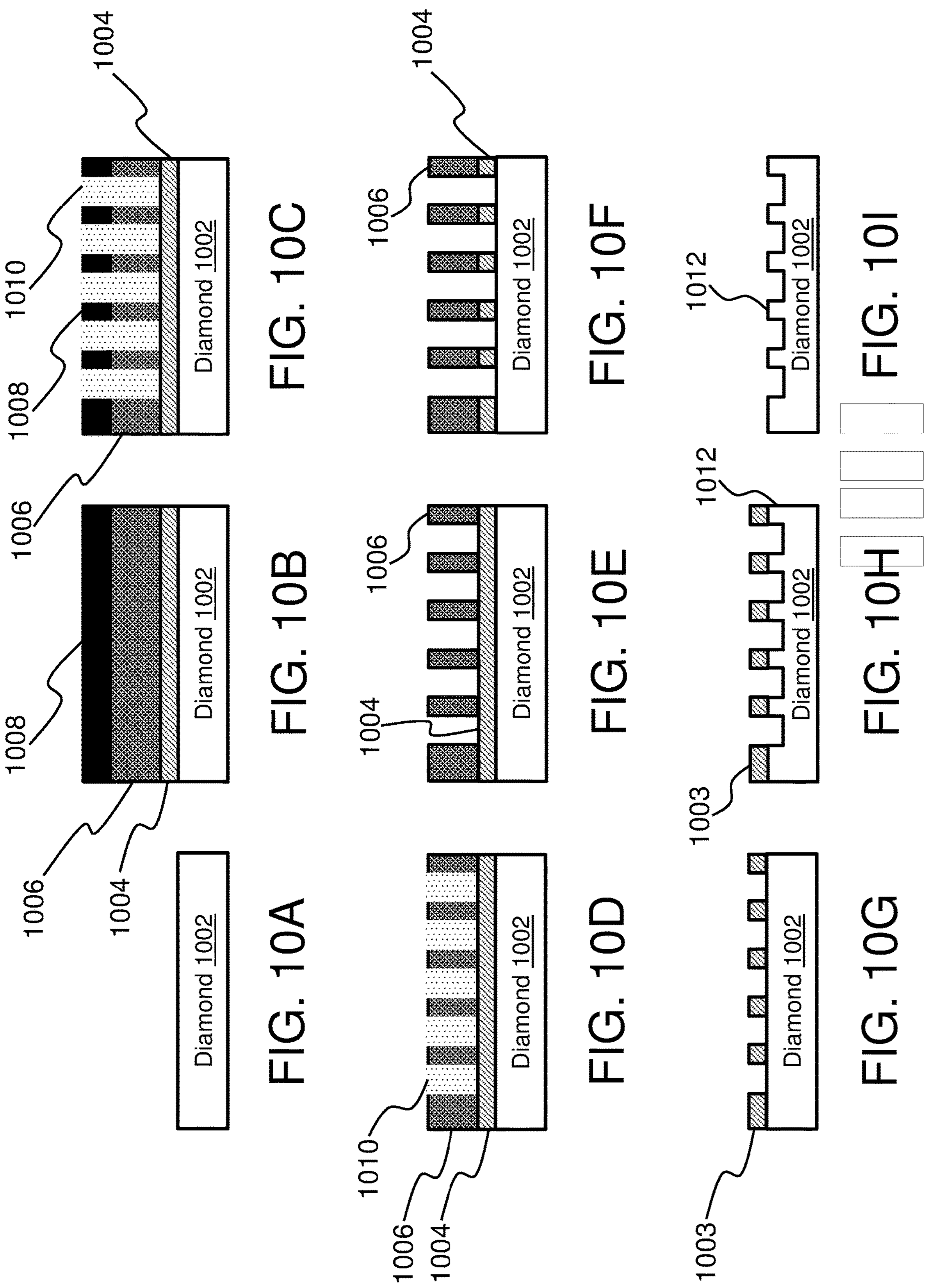
FIGS. 10A-I are schematic diagrams of fabrication steps for processing pillars in diamond.

FIGS. 10A, 10B, 10C. 10D, 10E, 10F, 10G, 10H, and 10I show example fabrication steps for processing pillars in diamond.

FIG. 10A shows a diamond layer 1002 that can be used as the starting material for a nanofabrication process and that may be prepared, for example, by performing dry etching for relief of the surface strain layer, blanket implantation with Si, and annealing at up to 1100° C.

FIG. 10B shows a SiN layer 1004 deposited (e.g., by PECVD) on top of a diamond layer 1002, an electron beam resist layer 1006 (e.g., ZEP) spun on top of the SiN layer 1004, and a charge dissipating layer 1008 (e.g., ESpacer) spun on top of the electron beam resist layer 1006.

FIG. 10C shows a SiN layer 1004 on top of a diamond layer 1002, an electron beam resist layer 1006 on top of the SiN layer 1004, and a charge dissipating layer 1008 on top of the electron beam resist layer 1006, after patterning regions 1110 (e.g., via electron beam lithography).

FIG. 10D shows a SiN layer 1004 on top of a diamond layer 1002 and an electron beam resist layer 1006 on top of the SiN layer 1004, after patterning patterned regions 1110 and removing a charge dissipating layer (e.g., the charge dissipating layer of FIG. 10C).

FIG. 10E shows a SiN layer 1004 on top of a diamond layer 1002 and an electron beam resist layer 1006 on top of the SiN layer 1004, after removing patterned regions (e.g., the patterned regions 1110 of FIG. 10D) that result in a pattern of disks.

FIG. 10F shows a SiN layer 1004 on top of a diamond layer 1002 and an electron beam resist layer 1006 on top of the SiN layer 1004, after transferring the pattern (e.g., by etching) of the removed electron beam resist layer 1006 into the SiN layer 1004.

FIG. 10G shows a SiN layer 1004 on top of a diamond layer 1002 after stripping an electron beam resist layer (e.g., the electron beam resist layer 1006 of FIG. 10F).

FIG. 10H shows a SiN layer 1004 on top of a diamond layer 1002, after performing a reactive ion etch with an O2 plasma that transfers the pattern of the SiN layer 1004 into the diamond layer 1002, forming diamond pillars 1012.

FIG. 10I shows a diamond layer 1002 and diamond pillars 1012 formed after stripping away a SiN layer (e.g., the SiN layer 1004 of FIG. 10H).

Figure 11A:
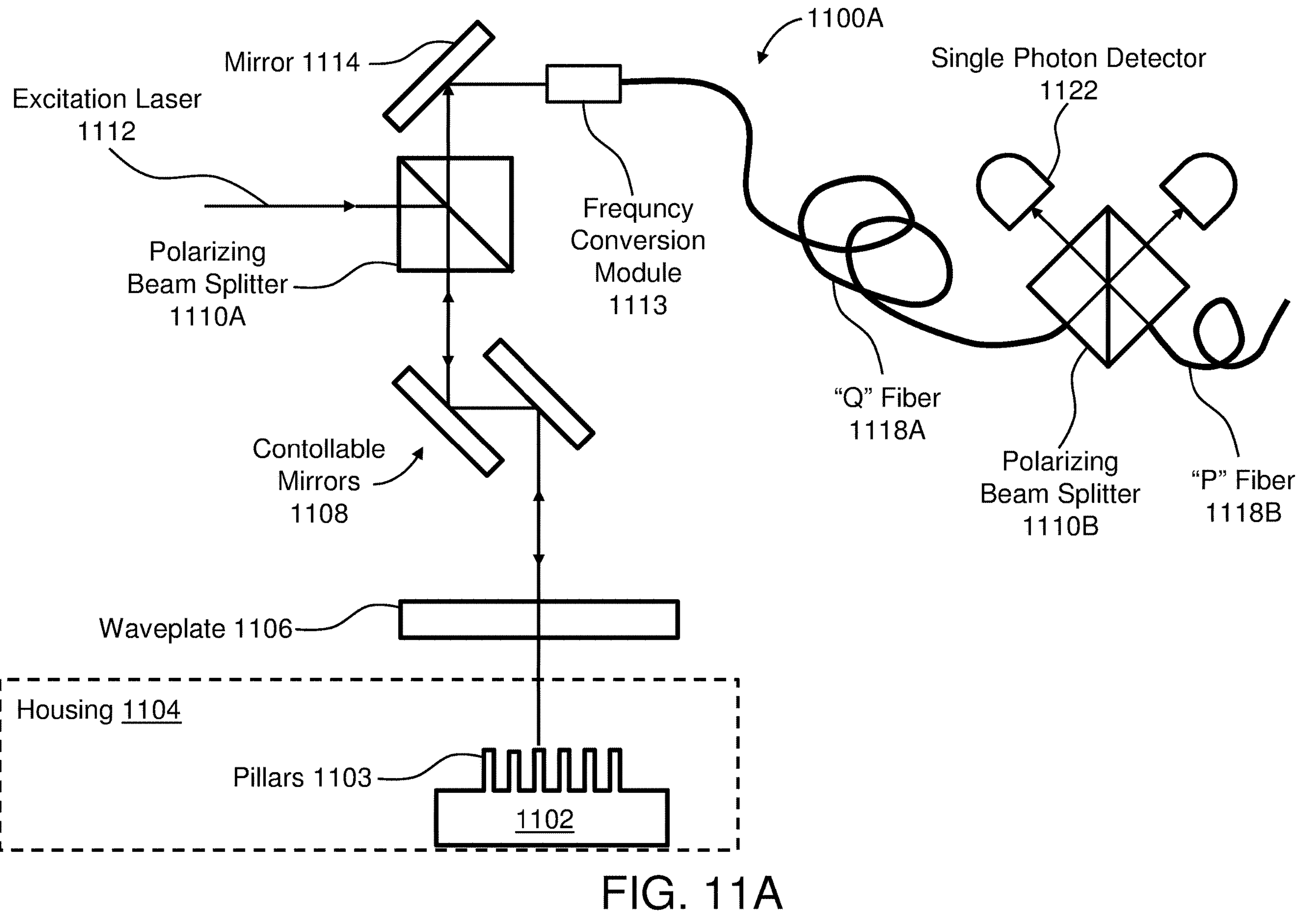
FIG. 11A is a schematic diagram of an example entanglement system.

FIG. 11A shows an example entanglement system 1100A providing entanglement across a network of quantum repeaters comprising a “P” node and a “Q” node. In some examples, the number of quantum repeaters is greater than 10,000. A diamond 1102 comprises a patterned array of pillars 1103, where each pillar 1103 contains one or more spectrally distinct color centers that can be used as QSEEs. The pillars 1103 may be used to direct the emission of the color centers (i.e., QSEEs) into a well-defined output mode.

The diamond 1102 may be maintained at cryogenic temperatures within a housing 1104. A pair of controllable mirrors 1108 can be used to scan the spatial overlap between the carrier mode (e.g., the carrier mode of an excitation laser 1112 that traverses through a first polarizing beam splitter 1110A) and the output modes of the various QSEEs. The excitation laser 1112 is optically coupled to a frequency conversion module 1113 (e.g., an EOM) by a mirror 1114. Within a given pillar 1103, the laser light within the pillar 1103 can be modulated (e.g., in frequency) to spectrally select and address a single color center, whose emission is then demodulated by the same amount back to the carrier frequency of the light output by the excitation laser 1112 and sent to the frequency conversion module 1113. The emission from a QSEE in one of the pillars 1103 is optically coupled to a "Q" fiber 1118A that is optically coupled to a second polarizing beam splitter 1110B, where it is overlapped with the emission from a second, distant repeater node labelled "P" that is optically coupled to a "P" fiber 1118B, and the output ports of the second polarizing beam splitter 1110B are monitored by single photon detectors 1122.

Figure 11B:
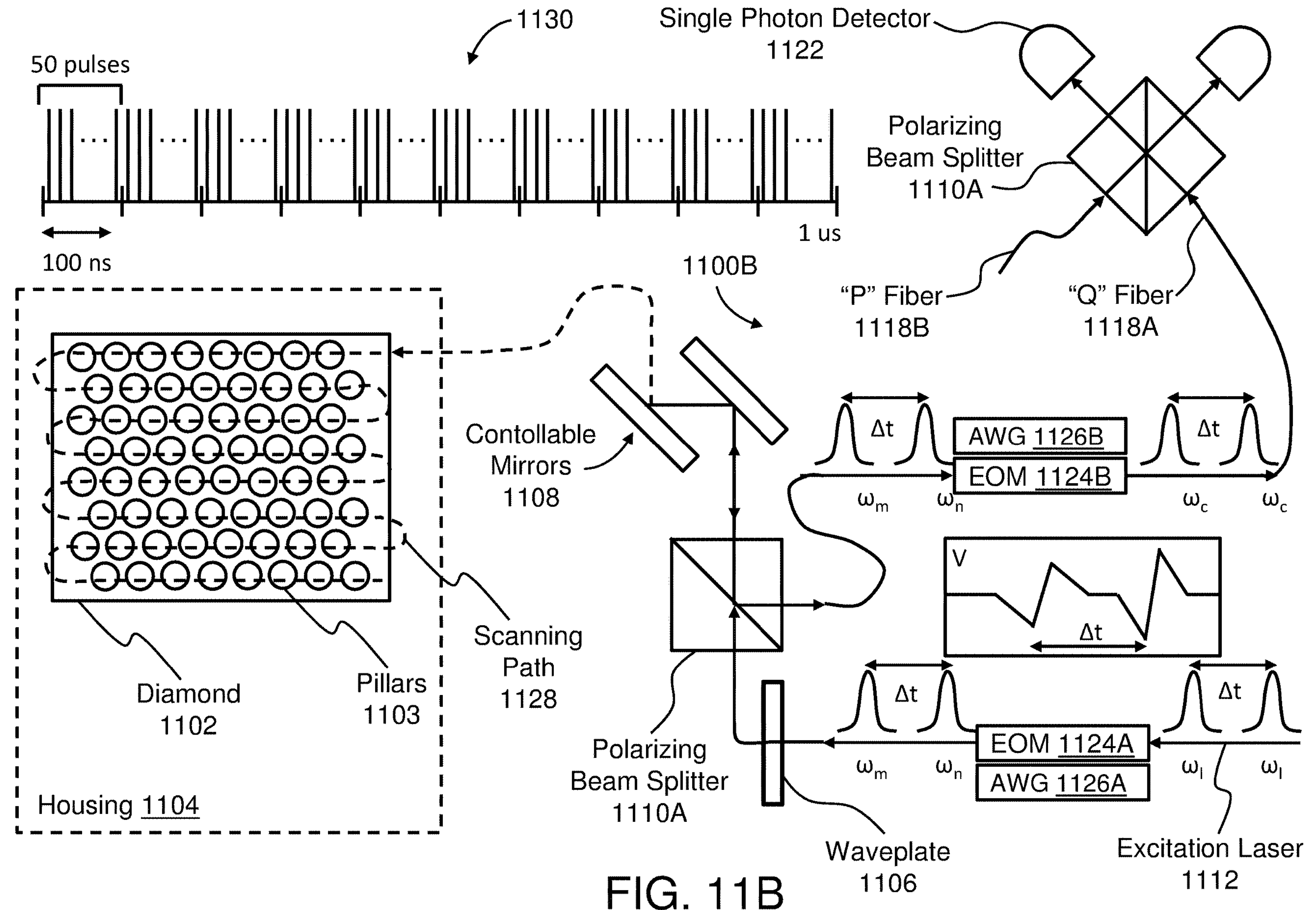
FIG. 11B is a schematic diagram of an example entanglement system.

FIG. 11B shows an example entanglement system 1100B and an example pulse timing sequence 1130 (e.g., derived from an excitation laser 1112). The pulse timing sequence 1130 comprises approximately 50 resonant excitation pulses per color center, with each pillar 1103 in a diamond 1102 comprising approximately 10 color centers. Each pillar 1103 may be addressed within 1 microsecond, in some examples. Within that 1 microsecond there can be 10 clock cycles, each consisting of 50 resonant excitation pulses. In some examples, for each clock cycle the laser can be modulated to a different frequency (e.g., using electro-optic modulators controlled by AWGs (arbitrary waveform generators)) to address each one of the spectrally distinct color centers. In the next microsecond, the excitation/collection mode can be spatially scanned to overlap with the output mode of another pillar 1103. In this example, the excitation laser 1112 emits resonant excitation pulses that each have a frequency of $\omega_l$ and that traverse through a first EOM 1124A and a first AWG 1126A, allowing the frequency and pulse shape to be varied (e.g., transforming two pulses of frequency $\omega_l$ into two pulses of frequencies $\omega_m$ and $\omega_n$, respectively). Controllable mirrors 1108 allow for light from the excitation laser 1112 to be scanned over the pillar 1103 along a scanning path 1128. A second EOM 1124B and a second AWG 1126B can be used to transform the two pulses of frequencies $\omega_m$ and $\omega_n$ back to a frequency of $\omega_l$ before optically coupling the pulses to a "Q" fiber 1118A.

Figures 12A, 12B:
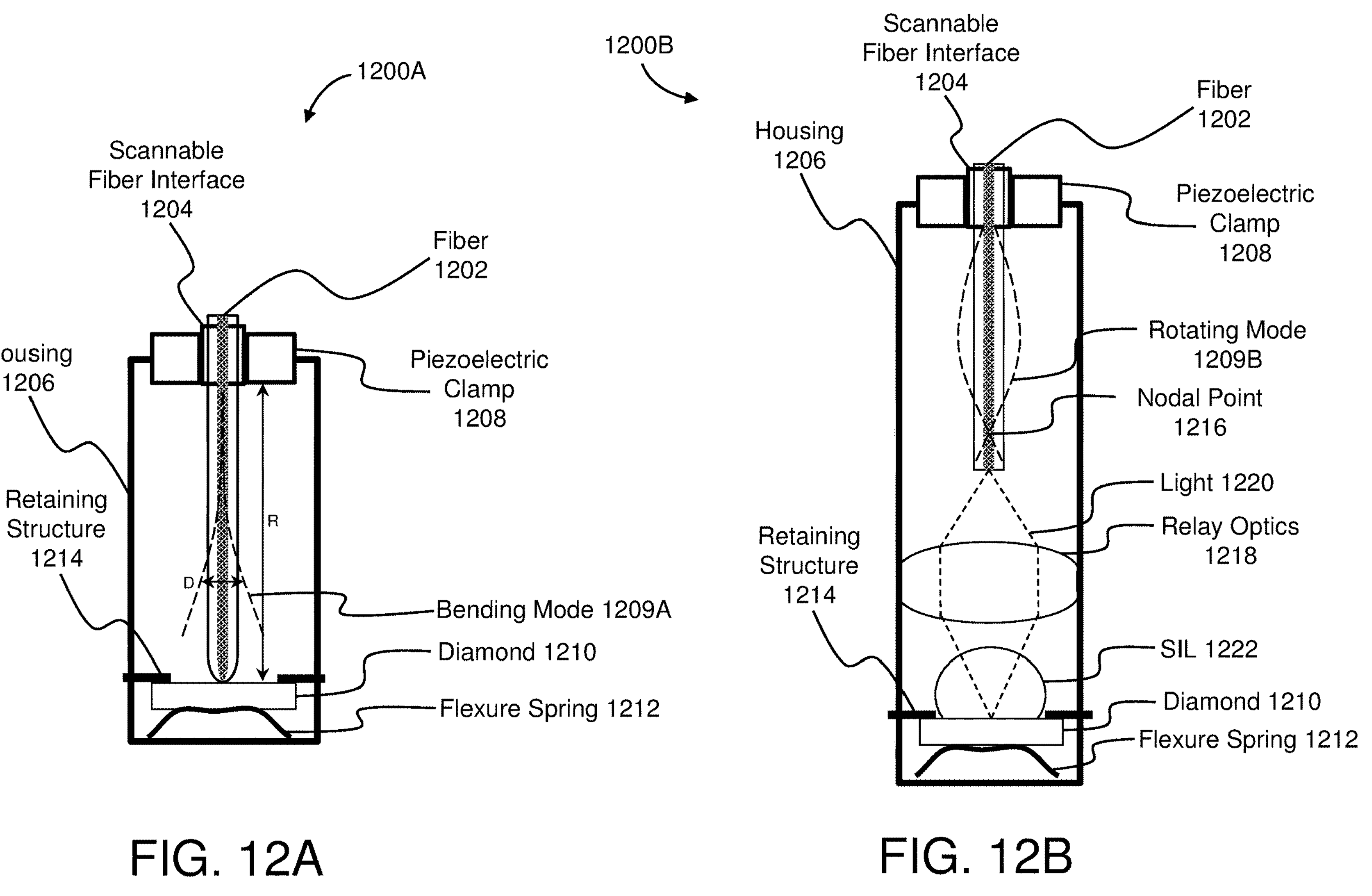
FIG. 12A is a schematic diagram of an example optical scanner.
FIG. 12B is a schematic diagram of an example optical scanner.

FIG. 12A shows an example optical scanner 1200A comprising a fiber 1202 and a scannable fiber interface 1204. The fiber 1202 (e.g., a single-core or multi-core fiber) is inserted through a wall of a housing 1206 and is attached to the scannable fiber interface 1204 via a piezoelectric clamp 1208. The fiber 1202 has a length R after the piezoelectric clamp 1208 and a diameter D. The end of the fiber 1202 may be shaped to provide a lensing effect that causes the light emitted by the fiber 1202 to be focused to a focal region at a distance from the end of the fiber 1202. The piezoelectric clamp 1208 can be translated by an applied electric signal to excite one or more of the resonant frequencies of bending modes 1209A of the fiber 1202, causing the optical modes of the fiber to be scanned across a diamond 1210 that is secured against a flexure spring 1212 and retaining structures 1214. The retaining structures may be monolithically formed from the wall of the housing 1206. In some examples, the fiber 1202 may be azimuthally asymmetric, such that it has two bending modes of different frequencies in different directions. Electrically driving the piezoelectric clamp 1208 at one of the frequencies thereby drives only one of the bending modes 1209A, effecting motion along a well-defined axis. The resonant frequency of the fiber bending mode 1209A thus sets a limit on the scanning rate along the axis of the bending mode 1209A. Scanning along an axis perpendicular to that bending mode 1209A may be accomplished by exciting an orthogonal bending mode of the fiber 1202, or by translating the fiber 1202 relative to the diamond 1210 via the piezoelectric clamp 1208. The scannable fiber interface 1204 may include a threaded adjustment screw (not shown) to allow for translation of the fiber 1202 along its propagation axis, which is perpendicular to the plane of the diamond 1210. The adjustment screw therefore allows for alignment of the focal spot of the fiber 1202 to the diamond 1210. The adjustment screw and the housing 1206 may be made of material having similar thermal expansion/contraction properties as the fiber 1202, such that the focal spot may be aligned at room temperature and the system may still be in alignment after being cooled to cryogenic temperatures. The fiber 1202 can be driven at or near the resonance frequency of one or more of its bending modes 1209A, causing the end of the fiber 1202 to move either by translating (as shown in FIG. 12A) or by rotating (as shown in FIG. 12B), effecting the scanning of the overlap of the fiber optical mode with various of the optical modes associated with pillars in the diamond 1210. Translation may be accomplished by exciting the fundamental bending mode 1209A of the fiber 1202, while rotation of the fiber end may be accomplished by exciting higher-order bending modes such that a node of the fiber motion is located near the tip of the fiber 1202.

FIG. 12B shows an example optical scanner 1200B. A piezoelectric clamp 1208 can excited one or more rotating modes 1209B of a fiber 1202. The fiber 1202 may be weighted towards its end in order to shift the position of a nodal point 1216 towards the weight. In the case where a higher-order bending mode is driven, such that the tip of the fiber 1202 moves primarily by rotating, a system of relay optics 1218, for instance a pair of lenses in a 4f configuration and a focusing lens, may be used to translate the rotational motion of the end of the fiber 1202, and thus light 1220 emitted by the fiber 1202, into a translational motion of the light 1220 across a diamond 1210, as well as for focusing of the light 1220 onto the diamond 1210. A SIL 1222 may be used to reduce total internal reflection (e.g., in the half-ball configuration), or can be used as an additional focusing element (e.g., in the Weirstrass configuration) in conjunction with the relay optics 1218.

Referring again to FIGS. 12A and 12B, the diamond 1210 may be structured into nanophotonic structures, in which case the numerical aperture of the end of the fiber 1202 is preferably matched to the numerical aperture of the optical modes of the nanophotonic structures. For instance, if the nanophotonic structures are pillars of a cylindrical, tapered conical, or paraboloidal geometry, they may have numerical apertures less than 0.7, less than 0.4, or less than 0.15. The end of the fiber, shaped to acts as a lens element, may therefore be designed to have a similar numerical aperture, such that the optical mode of the nanophotonic structures is well matched to one or more modes of the fiber 1202. In some examples, the fiber 1202 may be driven in one direction by resonantly driving a bending mode 1209A, and in another direction by translating the fiber 1202 along its propagation axis.

FIGS. 13A, 13B, 13C, 13D, 13E, and 13F show various example scanning structures.

Figure 13A:
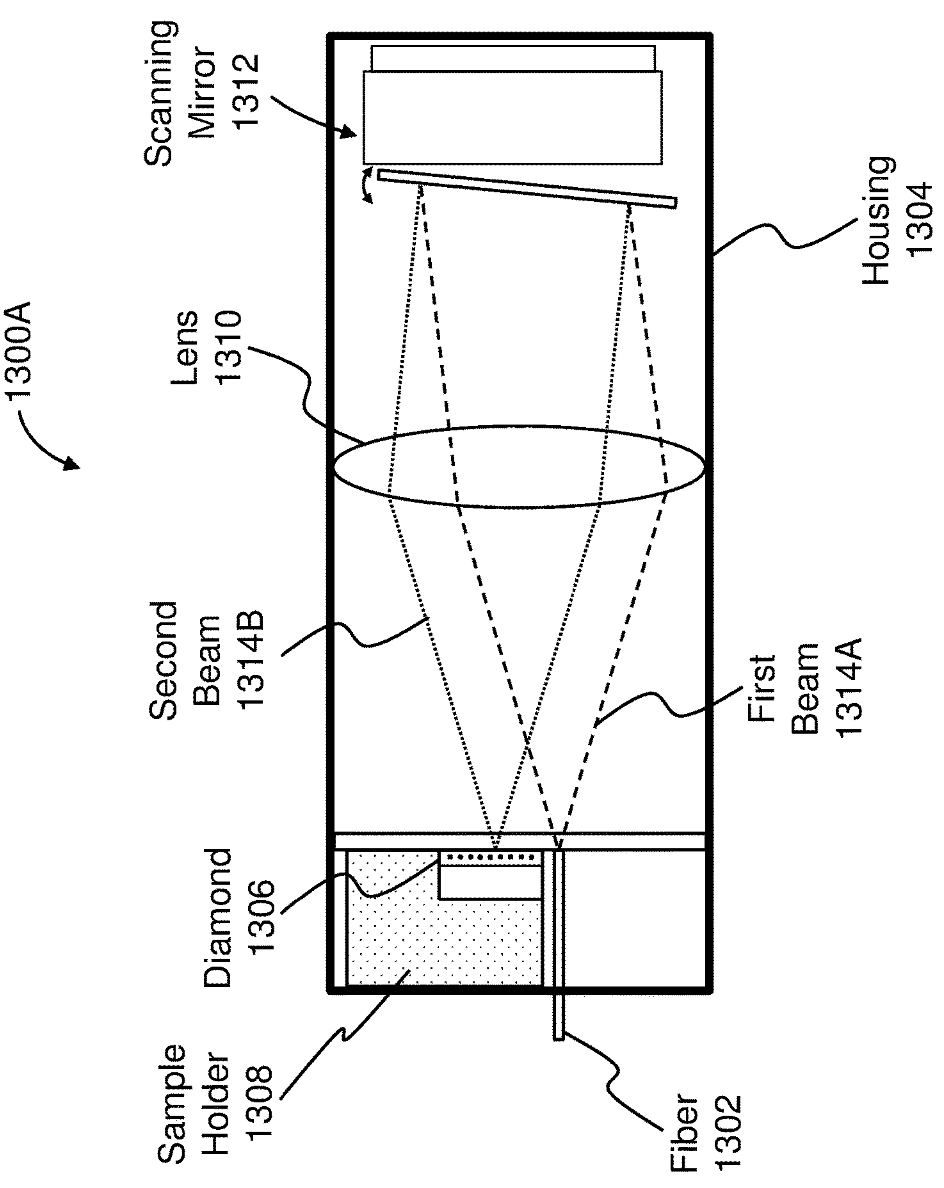
FIG. 13A is a schematic diagram of an example scanning structure.

FIG. 13A shows an example scanning structure 1300A. A fiber 1302 enters into a housing 1304 and terminates in proximity to a diamond 1306 held in a sample holder 1308, such that the fiber 1302 and the diamond 1306 are both in the focal plane of a lens 1310. The lens 1310 is positioned a focal length away from a plane of the diamond 1306, such that light emitted from the fiber 1302 and light emitted from the QSEEs (e.g., color centers), represented as dots in the diamond 1306, are collimated by the lens 1310, and are incident on a scanning mirror 1312 (e.g., a MEMs mirror), which can be positioned one focal length from the lens 1310 and on the opposing side of the lens 1310 to the diamond 1306 and the fiber 1302. Thus, motion of the scanning mirror 1312 along two axes translates the fiber mode of light across the diamond 1306 such that its overlap is scanned across the various QSEEs. The scanning mirror 1312 need not be placed precisely at a distance of one focal length from the lens 1310, however such an arrangement may be advantageous from the point of view of converting motion of the scanning mirror 1312 into translation of the fiber focal spot across many distinct optical modes on the diamond 1306, and from the point of view of translating the optical mode of the fiber across the diamond 1306 without rotating it relative to an axis that is orthogonal to the plane of the diamond 1306. In this example, a first beam 1314A is emitted by the fiber 1302, traverses through the lens 1310, and is reflected by the scanning mirror 1312, thereby resulting in a second beam 1314B that is redirected through the lens 1310 and onto the diamond 1306. One or more QSEEs in the diamond 1306 re-emit the light as the second beam 1314B, which then propagates in the reverse order back to the fiber 1302.

Figure 13B:
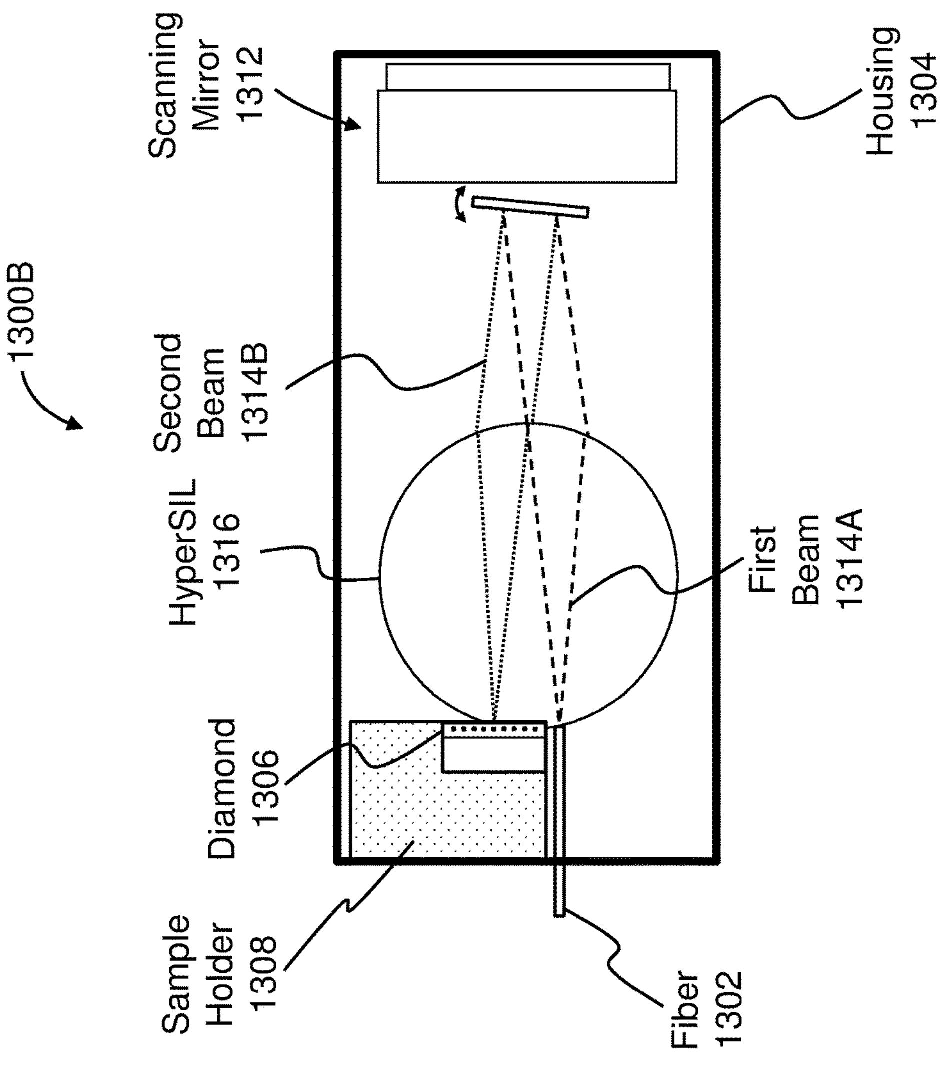
FIG. 13B is a schematic diagram of an example scanning structure.

FIG. 13B shows an example scanning structure 1300B. In this example, a hyperSIL 1316 is used as a focusing element. Similar to FIG. 13A, the fiber 1302 is terminated in the same plane as QSEEs in a diamond 1306, and this plane is positioned at the focal plane of the hyperSIL 1316, such that the fiber mode and the emission from QSEEs are both collimated by the hyperSIL 1316. A scanning mirror 1312 can be located at a distance of one focal length from the hyperSIL 1316. In general, the focal length inside the (high index of refraction) hyperSIL 1316 is typically longer than the focal length outside the hyperSIL 1316 in the low index of refraction vacuum environment. In both FIG. 22A and FIG. 22B configurations, the positioning of the termination of the fiber 1302 can be in close proximity to the QSEEs such that the incidence angle of the fiber mode on the scanning mirror 1312 is minimally displaced from normal incidence, thereby enhancing the cross-section of the scanning mirror 1312 to the fiber mode, which can be advantageous as it allows for increasing the number of addressable modes given the scan rate and mirror size of the scanning mirror 1312.

Figure 13C:
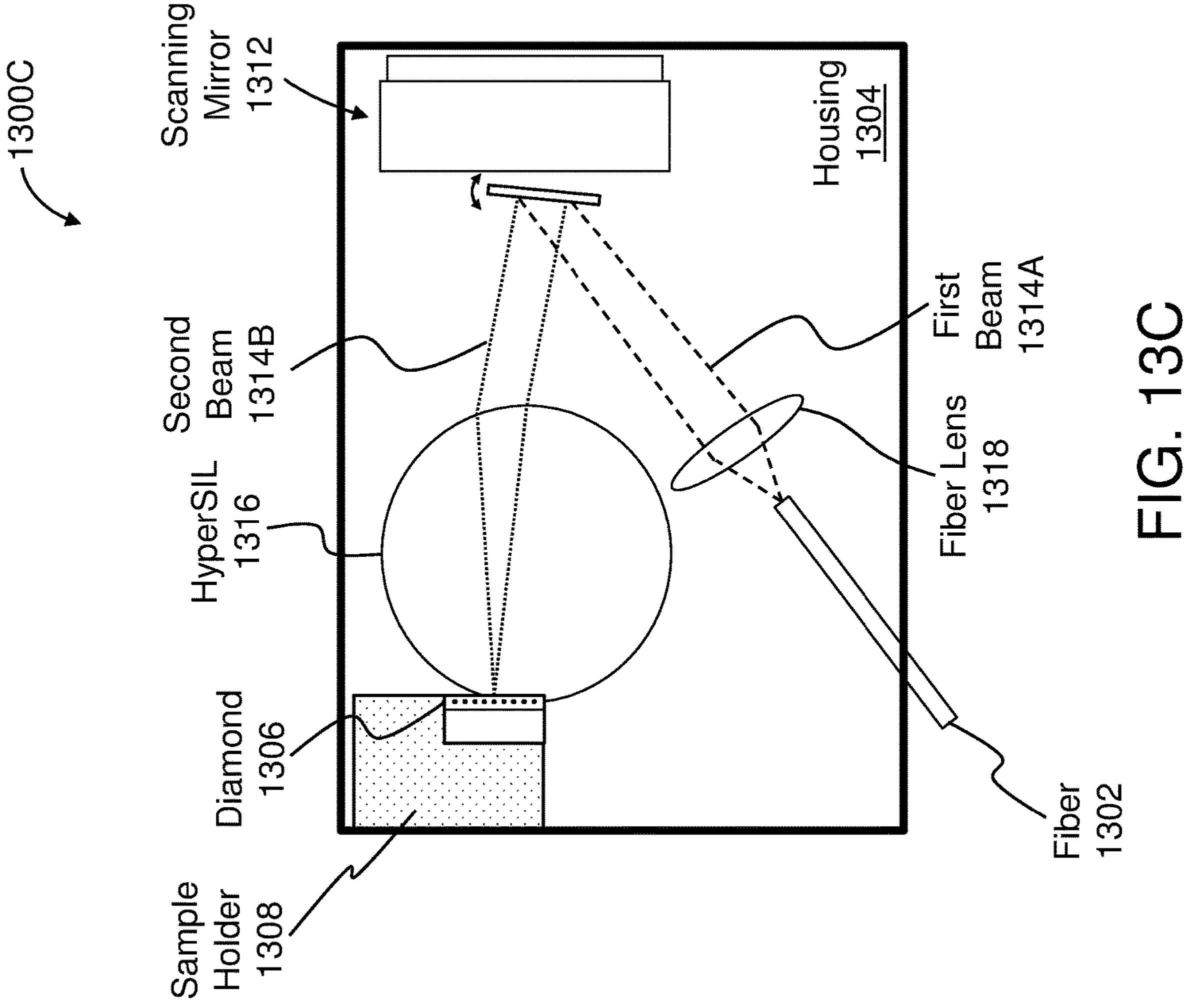
FIG. 13C is a schematic diagram of an example scanning structure.

FIG. 13C shows an example scanning structure 1300C. In this example, a fiber lens 1318 is used in conjunction with a hyperSIL 1316 to scan light from a fiber 1302 across a diamond 1306. The fiber 1302 and the fiber lens 1318 may be located in proximity to the diamond 1306 and the hyperSIL 1316 in order to reduce the angle of incidence on the scanning mirror. The fiber interface is terminated in the focal plane of the fiber collimating lens, such that the fiber mode is collimated by the fiber collimation lens and the collimated mode is incident on a scanning mirror 1312. The diamond 1306 can be located at the focal plane of the hyperSIL 1316, such that emission from the QSEEs in the diamond 1306 is collimated by the hyperSIL 1316 and the collimated emission is incident on the scanning mirror 1312. In this configuration, the fiber lens 1318 and the hyperSIL 1316 may be selected so as to optimize the overlap of the fiber mode with that of the QSEEs. In particular, the fiber mode and the modes of the QSEEs need not have the same numerical aperture, as their modes may be matched by appropriate selection of focal lengths of the hyperSIL 1316 and the fiber lens 1318. The scanning mirror 1312 can be located a distance of one focal length of the hyperSIL 1316 from a point on the surface of the hyperSIL 1316 in order to increase the number of addressable modes on the diamond 1306.

Figure 13D:
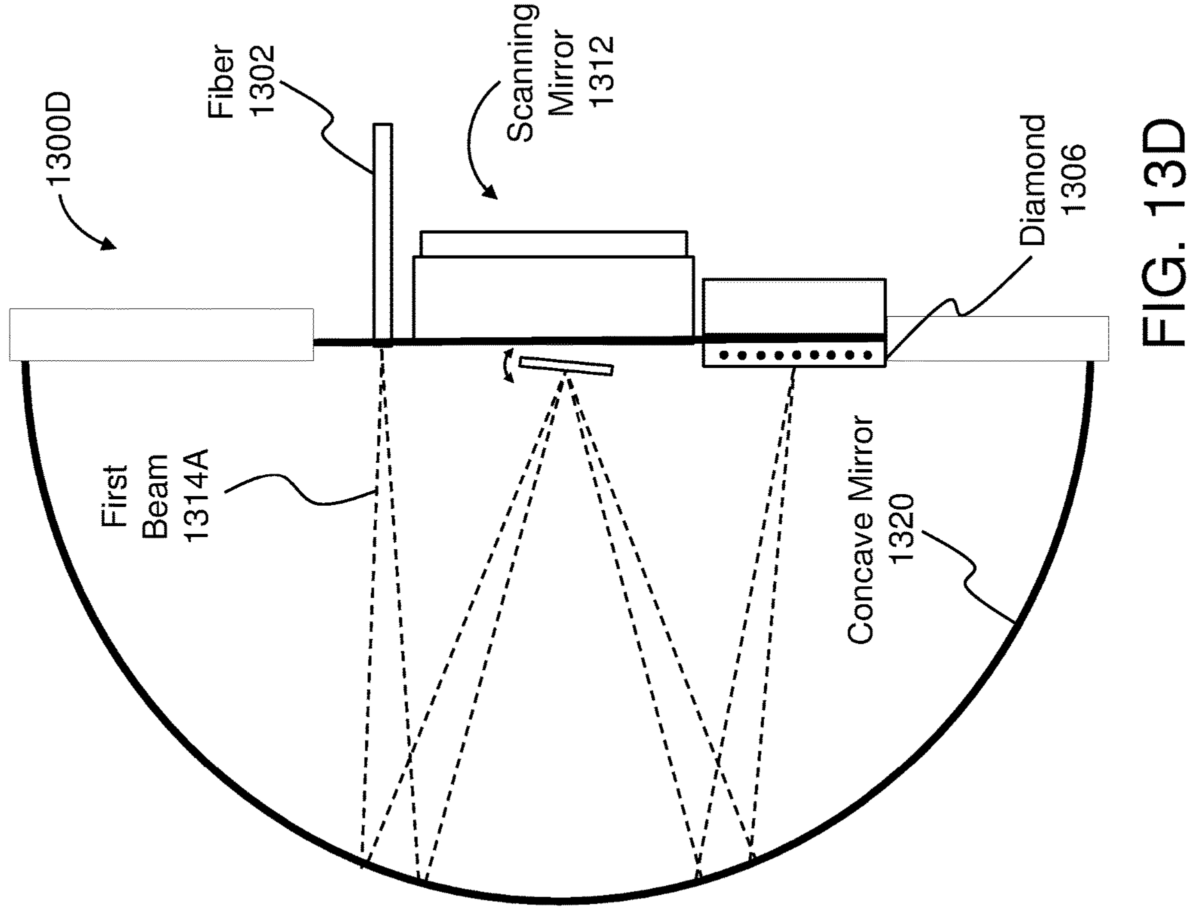
FIG. 13D is a schematic diagram of an example scanning structure.

FIG. 13D shows an example scanning structure 1300D. A first beam 1314A is emitted from a fiber 1302, reflected off a concave mirror 1320, reflected off a scanning mirror 1312, reflected off the concave mirror 1320 again, and directed towards QSEEs of a diamond 1306. Emission from the QSEEs can follow the same path in the reverse direction. The concave mirror 1320 may be configured with a curvature and a distance from the three elements (the fiber 1302, the scanning mirror 1312, and the diamond 1306) so as to bring the fiber mode (e.g., the first beam 1314A) to a focus on the scanning mirror 1312, and again to a focus on the diamond 1306. Alternatively, the concave mirror 1320 may be configured with a curvature and a distance from the three elements such that the fiber mode is collimated by the concave mirror 1320 and is then incident on the scanning mirror 1312 as a collimated beam, and subsequently focused by the second reflection off the concave mirror 1320 onto the diamond 1306. The fiber 1302, scanning mirror 1312, and the diamond (e.g., the QSEEs) may be positioned to be coplanar with each other, but they may also be positioned in a non-coplanar geometry. In some examples, the two reflections off the concave mirror 1320 result in the fiber mode being focused onto the diamond 1306, either by first collimating the light on the first reflection and subsequently refocusing it on the second, or by producing an intermediate focus between the first and second reflections (e.g., at the location of the scanning mirror 1312).

Figure 13E:
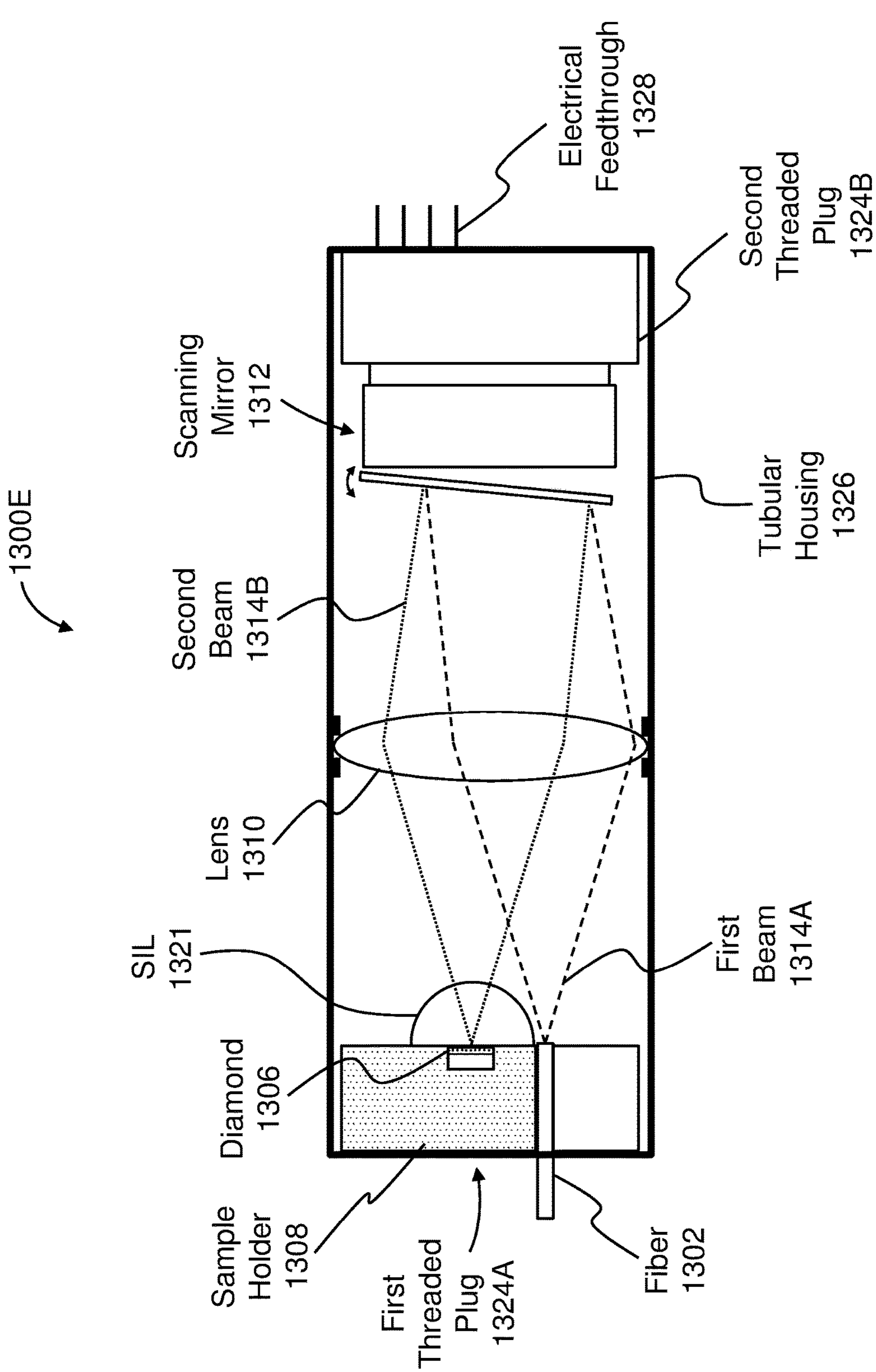
FIG. 13E is a schematic diagram of an example scanning structure.

FIG. 13E shows an example scanning structure 1300E. A fiber 1302 is terminated in the same plane as the QSEEs of a diamond 1306, and a hemispherical SIL 1321 (solid immersion lens) is in contact with the diamond 1306. In this example, the fiber 1302 may terminate as a bare fiber (i.e., not in a fiber interface) that is located at the flat surface of the SIL 1321. The fiber 1302, the diamond 1306, and the SIL 1321 are housed on a first threaded plug 1324A that is inserted into a tubular housing 1326. A lens 1310 is fixed in the tubular housing 1326 at a distance of one focal length from the plane of the fiber 1302 and the diamond 1306, where the distance can be controlled by rotating the first threaded plug 1324A. At the other end of the tubular housing 1326 is a scanning mirror 1312 that is mounted on a second threaded plug 1324B. In some examples, the distance between the scanning mirror 1312 and the lens 1310 is one focal length of the lens 1310, although this distance can be less critical than that between the lens 1310 and the fiber 1302 and the diamond 1306. The second threaded plug 1324B includes electrical feedthroughs 1328 for controlling the scanning mirror 1312. In this configuration, the lens 1310 collimates the fiber-coupled mode and the QSEE-coupled modes, and the scanning mirror 1312 scans the collimated fiber-coupled mode to overlap with various of the QSEE-coupled modes. The SIL 1321 can provide a high index of refraction medium for the QSEE-coupled modes to propagate through, such that the numerical aperture of the QSEE-coupled modes better matches the numerical aperture of the fiber 1302, and the modes can be well-matched by the lens 1310. A typical single mode fiber numerical aperture is 0.12, whereas the numerical aperture of the QSEE-coupled modes can be 0.3 to 0.4 for various tapered pillar nanostructures terminated directly into air. For tapered nanostructures that terminate into the SIL 1321, the numerical aperture can be reduced to 0.1 to 0.15, which better matches the fiber numerical aperture.

Figure 13F:
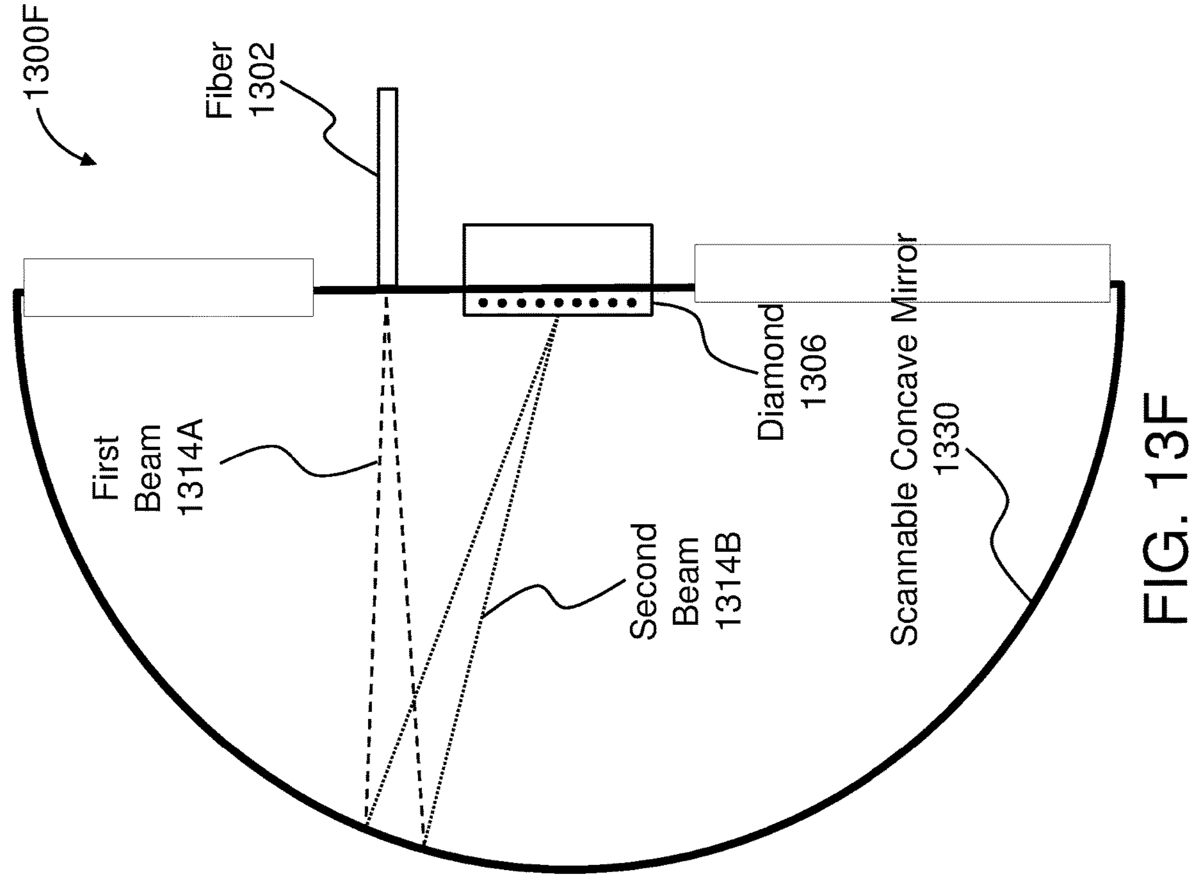
FIG. 13F is a schematic diagram of an example scanning structure.

FIG. 13F shows an example scanning structure 1300F. A fiber 1302 is terminated in the same plane as the QSEEs of a diamond 1306. A scannable concave mirror 1330 can be scanned either rotationally or translationally (e.g., by piezoelectric driving). A first beam 1314A emitted from the fiber 1302 is reflected once by the scannable concave mirror 1330, resulting in a second beam 1314B that is brought to a focus in the plane of the QSEEs of the diamond 1306. The second beam 1314B can be swept across the various QSEEs by motion of the scannable concave mirror 1330.

Figure 14A:
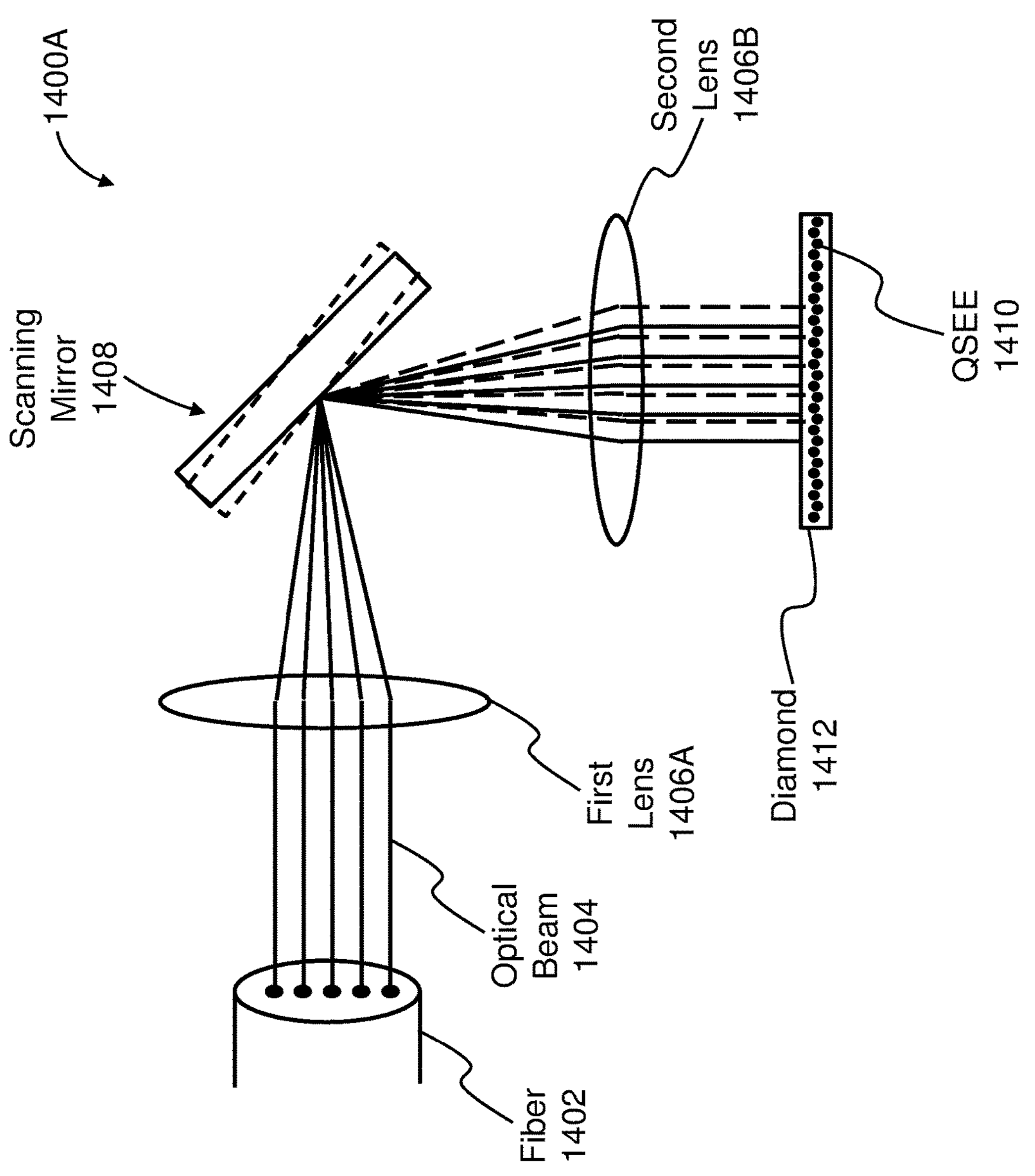
FIG. 14A is a schematic diagram of an example scanning structure.
Figure 14B:
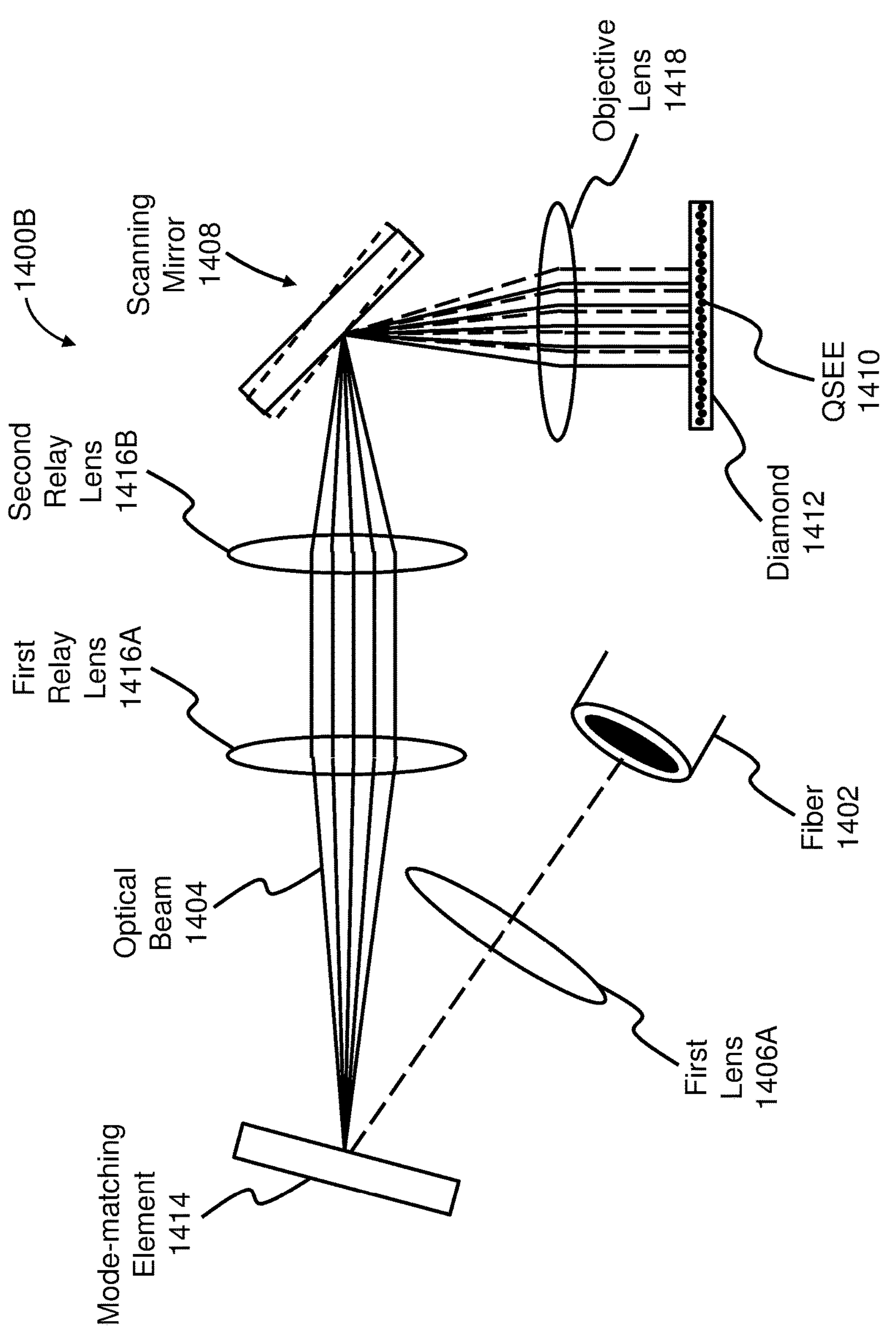
FIG. 14B is a schematic diagram of an example scanning structure.
Figure 14C:
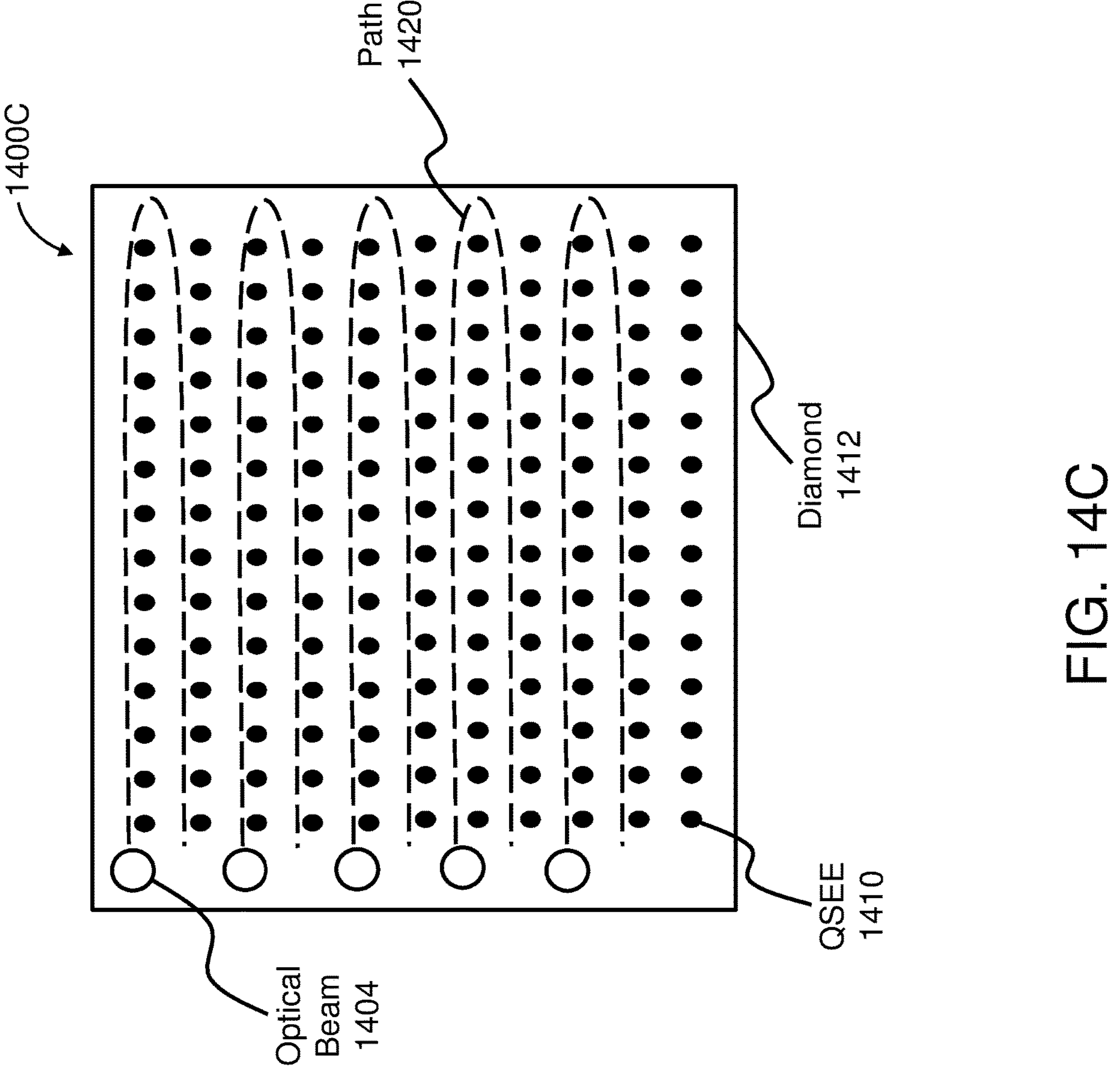
FIG. 14C is a schematic diagram of an example scanning procedure.

FIGS. 14A, 14B, and 14C show various aspects of example scanning structures with multiple modes of light. In some examples, simultaneous scanning of multiple QSEE-coupled optical modes can be conducted in parallel.

FIG. 14A shows an example scanning structure 1400A. A fiber 1402 can transmit and emit multiple distinct spatial modes which exit the fiber 1402 as an array of parallel optical beams 1404 each having a diverging intensity profile as it propagates away from the end of the fiber 1402. A first lens 1406A collimates the optical beams 1404 as they diverge, and at the same time redirects their axes to converge on a scanning mirror 1408. The optical beams 1404 are reflected by the scanning mirror 1408 and traverse a second lens 1406B that causes the various collimated optical beams 1404 to be focused onto an array of QSEEs 1410 at various distinct lateral focal positions of a diamond 1412. Thus, the optical beams 1404 corresponding to different fiber modes are imaged onto an array of focal spots that correspond with the locations of the QSEEs 1410. In some examples, the second lens 1406B may instead be a pair of relay lenses and an objective lens (e.g., as shown in FIG. 14B), or other combination of lenses or other optical elements. Rotation of the scanning mirror 1408 can cause the whole array of focal spots to laterally translate across the array of QSEEs 1410. Emission from the QSEEs is directed to the second lens 1406B and coupled into the corresponding fiber modes, allowing for laser excitation of and photon collection from the QSEEs to be executed in parallel.

FIG. 14B shows an example scanning structure 1400B. In this example, a mode-matching element 1414 operates in the Fourier plane relative to the output of a fiber 1402. The output of the fiber 1402 contains multiple independent spatial modes which are collimated by a first lens 1406A and directed onto the mode-matching element 1414 (e.g., a spatial light modulator) that comprises an array of independently controlled phase adjustment elements (not shown), after which the reflected light is collected by an imaging system, comprising a first relay lens 1416A and a second relay lens 1416B, and directed onto the scanning mirror 1408 and then an objective lens 1418. The phase adjustment elements may be individually tuned so as to match the modes of the fiber 1402 to a pattern of spatially separated focal spots at the plane of QSEEs 1410 that can be scanned across the QSEEs 1410 by the scanning mirror 1408.

FIG. 14C shows an example scanning procedure 1400C comprising scanning paths 1420 for each mode of a multiple mode fiber that are associated with respective optical beams 1404 that can be scanned in parallel (e.g., by using scanning structures 1400A or 1400B of FIG. 14A or 14B, respectively) over QSEEs 1410 in a diamond 1412.

In general, a fiber waveguide core array may be used to transmit light between one or more optical fibers and one or more diamonds comprising QSEEs. The fiber waveguide core array may be positioned with its distal end proximal to a printed circuit board (PCB) or CMOS chip having current-carrying traces and electrical connections to provide electromagnetic fields to manipulate the state of the QSEEs. The PCB or CMOS may be constructed with a hole or trench, such that the distal end of the fiber waveguide core array is flush with the surface of the PCB or CMOS chip, and the diamond sample may be attached to the distal end of the fiber waveguide core array that is inserted into the hole or trench in the PCB or CMOS chip. Such an arrangement may have the advantage of placing the QSEEs in the plane of the electrical elements of the PCB or CMOS chip, where the electromagnetic field can be at a maximum, or where the electromagnetic field can exhibit advantageous properties such as a maximal or minimal gradient.

Figures 15A, 15B:
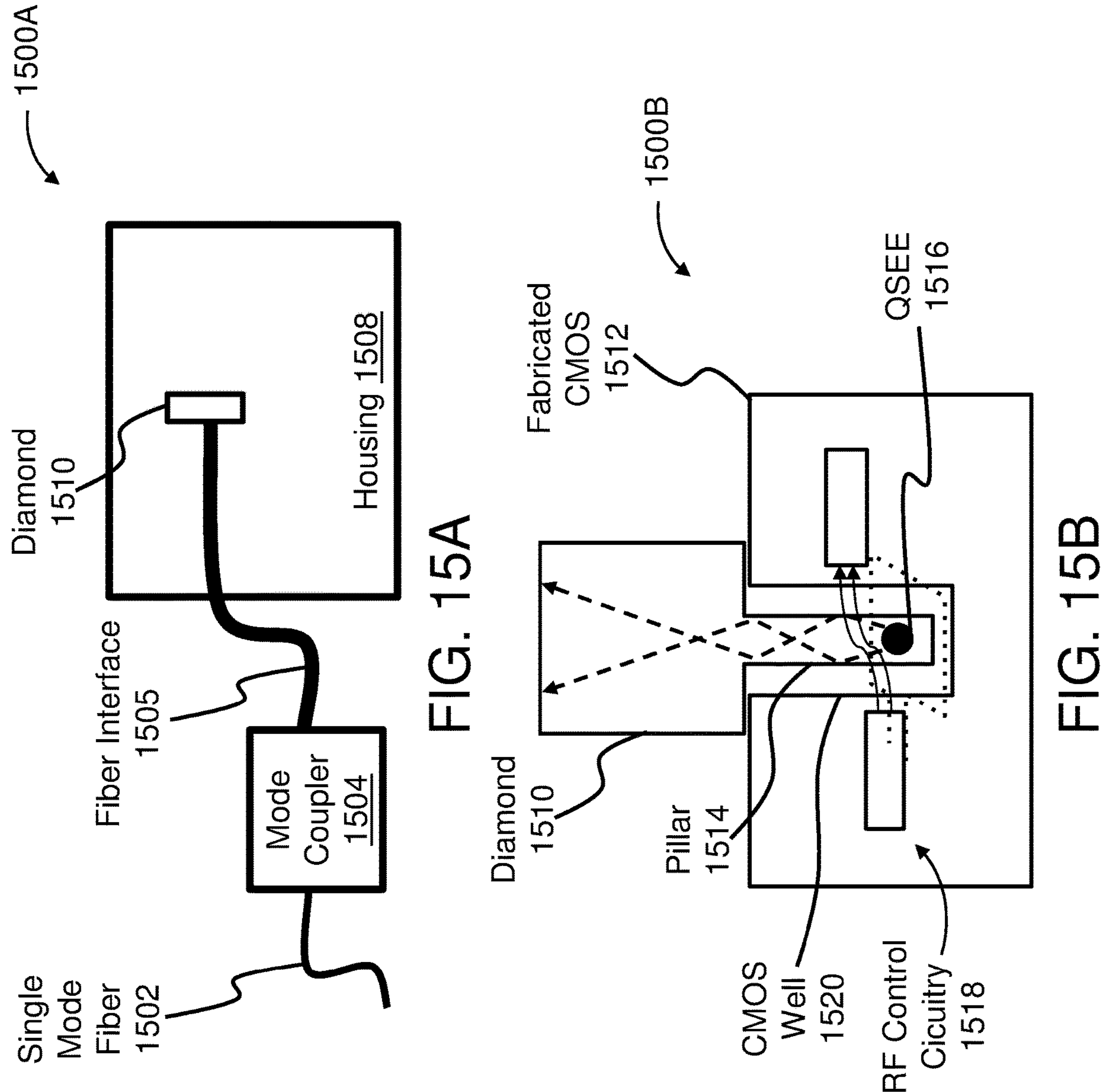
FIG. 15A is a schematic diagram of an example scanning structure.
FIG. 15B is a schematic diagram of an example interface between diamond and fabricated CMOS.

FIG. 15A shows an example scanning structure 1500A. In this example, a single mode fiber 1502 is optically coupled to a mode coupler 1504 (e.g., a spatial light modulator) that can transform the single mode of the single mode fiber 1502 into two or more modes of a fiber interface 1505, such as a fiber waveguide core array comprising array elements (not shown). The fiber interface 1505 enters a housing 1508 (e.g., maintained at a temperature less than 4 Kelvin) and is optically coupled to a diamond 1510. The fiber interface 1505 can support many modes, which can be significantly isolated from each other, but may be weakly coupled to a small number of other modes. For instance, the fiber interface 1505 may be a fiber waveguide core array with 100 or more modes, where each mode interacts weakly with fewer than 10 neighboring modes and interacts minimally or not at all with the remaining other modes. In other examples, the fiber interface 1505 may be a fiber waveguide core array with as many as 100,000 modes or more, each mode interacting with fewer than 10 neighboring modes and interacting minimally or not at all with the remaining other modes. The diamond 1510 containing the QSEEs can be positioned directly on the distal end of the fiber interface, such that excitation light from one mode of the fiber interface 1505 overlaps with at least one QSEE-coupled optical mode. Emission from the QSEE-coupled optical mode can be directed back into the fiber interface 1505 and transported to the proximal end of the fiber interface 1505, and may remain largely in the same fiber mode, with weak leakage into neighboring optical modes. The composite mode may then be reconstituted to have significant overlap with a single Gaussian spatial mode by the mode coupler 1504. Light from multiple QSEEs that may overlap the same fiber interface mode and may be distinguished by the spectral frequency of the emission (e.g., if the QSEEs are inhomogeneously spectrally distributed).

FIG. 15B shows an example interface 1500B between diamond 1510 and fabricated CMOS 1512. The diamond 1510 comprises a pillar 1514 within which a QSEE 1516 resides (e.g., a color center). RF control circuitry 1518 allows for control signals (e.g., RF or microwaves) to be applied to the QSEEs 1516 to manipulate their respective quantum states. The pillar 1514 is inserted into a CMOS well 1520 to allow for the RF control circuitry 1518 to more easily interact with the QSEEs 1516. In some examples, each CMOS well 1520 may have multiple pillars 1514 and/or multiple QSEEs 1516 inserted within it. The diamond 1510 can comprise numerous such pillars and the fabricated CMOS 1512 can comprise numerous such CMOS wells.

Figures 15C, 15D:
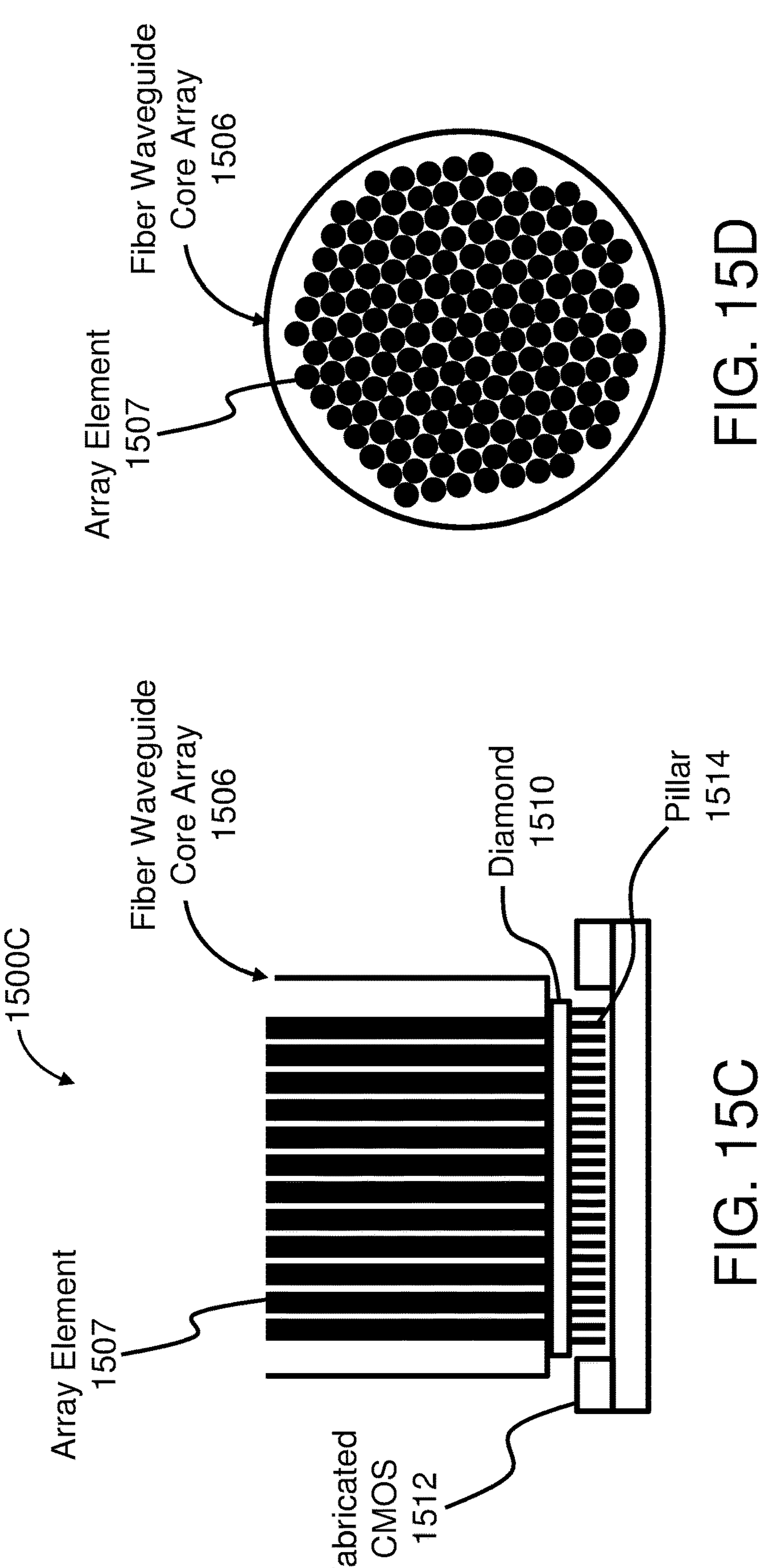
FIG. 15C is a schematic diagram of an example interface between diamond, fabricated CMOS, and a fiber waveguide core array.
FIG. 15D is a schematic diagram of an example fiber waveguide core array.

FIG. 15C shows an example interface 1500C between diamond 1510, fabricated CMOS 1512, and a fiber waveguide core array 1506 comprising array elements 1507.

FIG. 15D shows an example fiber waveguide core array 1506 comprising array elements 1507.

Figures 16A, 16B:
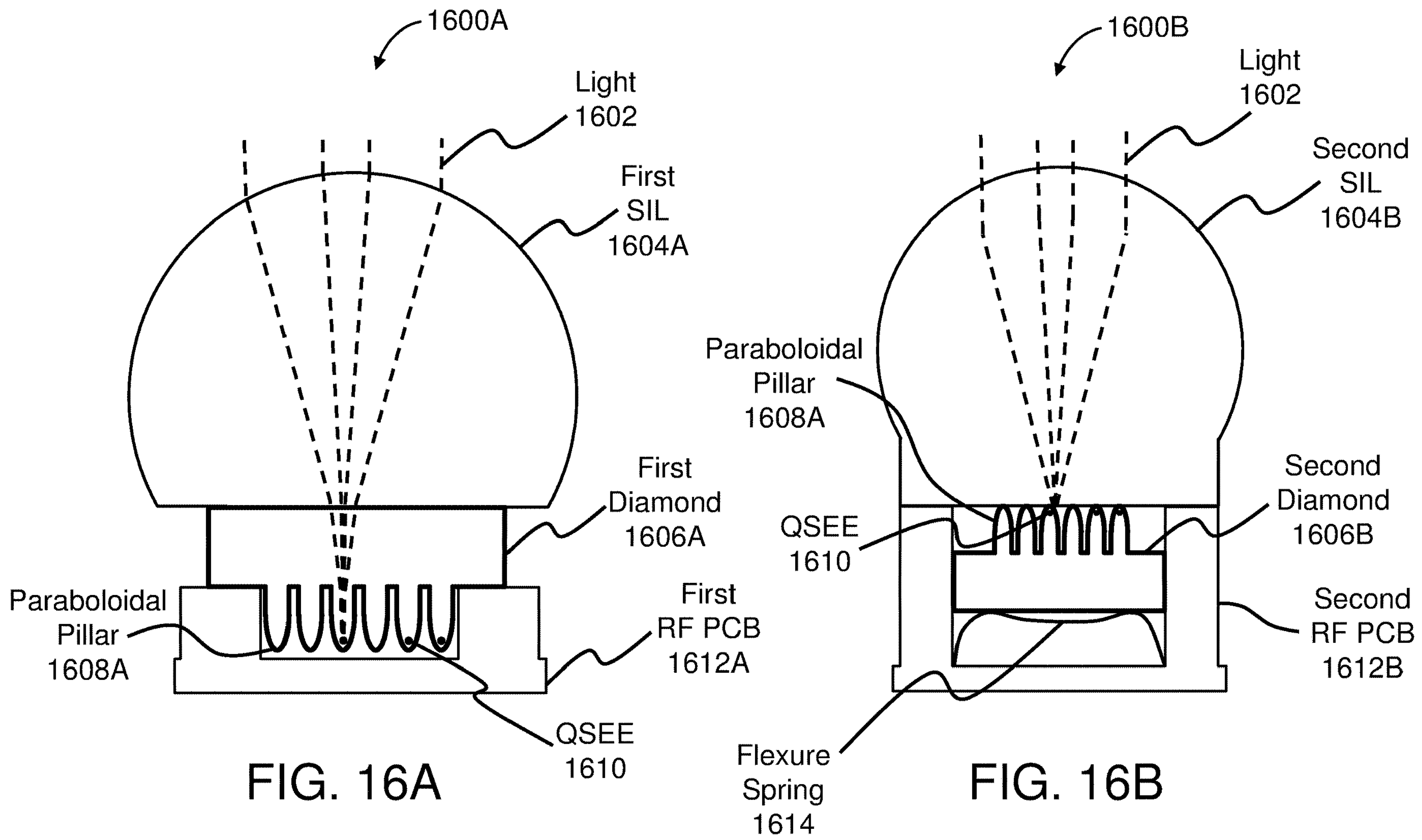
FIG. 16A is a schematic diagram of an example portion of a scanning structure.
FIG. 16B is a schematic diagram of an example portion of a scanning structure.

In some examples, the diamond sample may be nanostructured and positioned in relation to the distal end of a fiber waveguide core array (e.g., as shown in FIGS. 16A and 16B, where the fiber waveguide core array takes the place of the SIL). To multiplex the various modes of the fiber waveguide core array with a single fiber input/output mode, a scanning confocal setup can be used, where the proximal end of the fiber waveguide core array is located in the focal plane of the confocal setup, such that scanning of the confocal spot across the focal plane (e.g., via scanning of a MEMs mirror, galvanometer mirror, or any other scanning arrangement) results in overlap of the mode of the single input/output fiber with individual modes of the fiber waveguide core array. The array of QSEEs may be randomly positioned relative to the fiber waveguide core array, in which case the elements should be more tightly packed than the array elements (i.e., cores), in order to ensure at least one element per core. Alternatively, the array of QSEEs may be aligned to the individual cores of the fiber waveguide core array. To achieve the latter, the arrangement of cores may first be imaged, and subsequently an array of QSEEs having the same arrangement may be fabricated (e.g., using standard nanofabrication methods).

FIG. 16A shows an example portion of a scanning structure 1600A. Light 1602 enters a first SIL 1604A and is optically coupled through a first diamond 1606A to a paraboloidal pillar 1608A containing a QSEE 1610. Pillars (e.g., the paraboloidal pillars 1608A) can have a geometry, such as a tapered conical geometry, paraboloidal geometry, or other waveguiding geometry, that redirects the quantum state emission into a directional output mode, therefore acting as waveguiding elements. The pillars may be located on the distal side of the diamond (e.g., the first diamond 1606A shown in FIG. 16A) or on the proximal side of the diamond (e.g., the second diamond 1606B shown in FIG. 16B). The paraboloidal pillars 1608A are inserted into a first RF PCB 1612A. In the distal case, the emission from the QSEEs 1610 can be directed by the paraboloidal pillars 1608A primarily into the first diamond 1606A, such that it is directed into the direction of the imaging system. The proximal surface of the diamond may advantageously be positioned on the first SIL 1604A or a hyperSIL (not shown), such that reflection from the interface to the vacuum environment is minimized. In this case, the thickness of the diamond substrate and the propagation length through the SIL 1604A may be chosen so that the paraboloidal pillars 1608A are positioned one focal length from the proximal surface of the first SIL 1604A (i.e., the curved surface), such that their emission is collimated by the proximal SIL surface. The first SIL 1604A has the advantage that, if it is manufactured from material with similar index of refraction as the first diamond 1606A (e.g., diamond or cubic zirconia), the reflection from the diamond-SIL interface or diamond-hyperSIL interface is minimized, and the refraction of the optical mode is also minimized at that interface. The optical mode of a waveguiding element (e.g., a paraboloidal pillar 1608A) at the diamond-SIL interface (or diamond-hyperSIL interface) may be in the diffractive regime due to its confinement by the waveguiding element, and in this case the use of the first SIL 1604A (or hyperSIL) will additionally serve to minimize or reduce the subsequent diffraction of the mode as it propagates through the first SIL 1604A (or hyperSIL). This has the advantage of reducing the numerical aperture of the mode within the optical system, relative to the numerical aperture of the equivalent mode, were it to travel directly from the nanostructured waveguiding element into the vacuum environment at a planar diamond-vacuum interface. The first diamond 1606A may be affixed to the flat surface of the first SIL 1606A or hyperSIL by a clamping mechanism, or by gluing, or may simply rest in contact with said surface and be held in place by surface bonding forces. In the latter case, to facilitate said surface bonding forces being the dominant forces, the first diamond 1606A on which the waveguiding elements are arrayed may be reduced to a minimal thickness (e.g., less than 5 μm or less than 1 μm), such that the stiffness of the diamond is less than the surface bonding forces, and the first diamond 1606A deforms under the surface bonding forces so that it lies flush with the flat surface of the first SIL 1604A. The distal case also has the advantage that electrical connections, for instance to carry radio-frequency signals generated by the first RF PCB 1612A to control the quantum state of the QSEEs 1610, may be positioned in close proximity to the QSEEs 1610 (e.g., less than 100 μm, or less than 5 μm).

FIG. 16B shows an example portion of a scanning structure 1600B. Light 1602 enters a second SIL 1604B and is optically coupled through a second diamond 1606B to a paraboloidal pillar 1608A containing a QSEE 1610. A flexure spring 1614 secures the second diamond 1606B against the second SIL 1604B. In this proximal case, the QSEEs 1610 are positioned on the proximal side of the second diamond 1606B. This has the advantage that the diamond substrate is not in the optical path, and therefore does not introduce aberration or scattering loss into the optical system. Additionally, if a SIL or hyperSIL is used (e.g., the second SIL 1604B), the waveguiding elements may be pressed into the distal SIL/hyperSIL surface, such that the gap between the two materials is minimized.

Figure 16C:
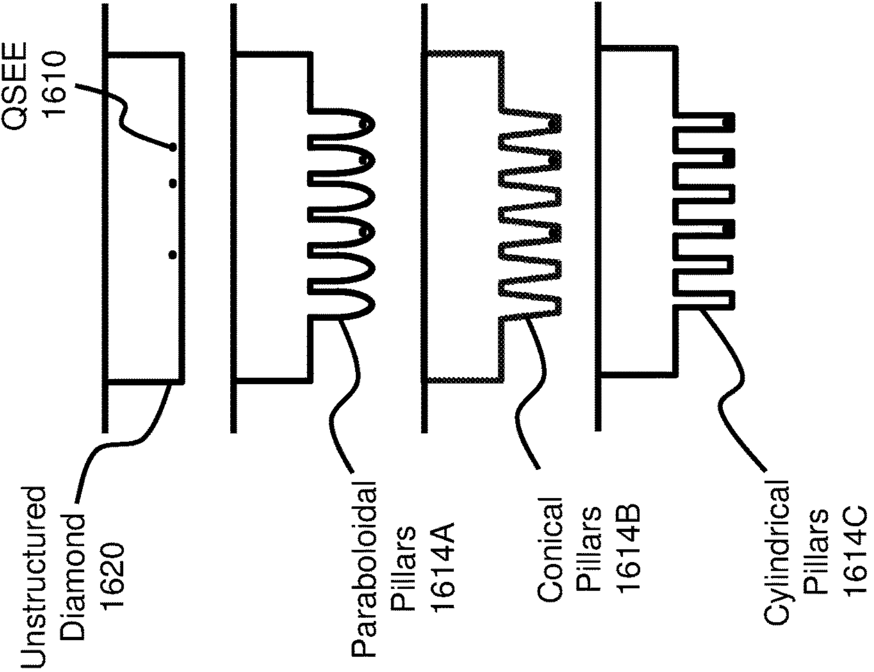
FIG. 16C is a schematic diagram of various example diamond structures.

FIG. 16C shows various example diamond structures. Unstructured diamond 1620 may contain QSEEs 1610, while structured diamond can have paraboloidal pillars 1614A, conical pillars 1614B, or cylindrical pillars 1614C. Within each of the pillars, QSEEs 1610 may or may not be present.

Figures 17A, 17B:
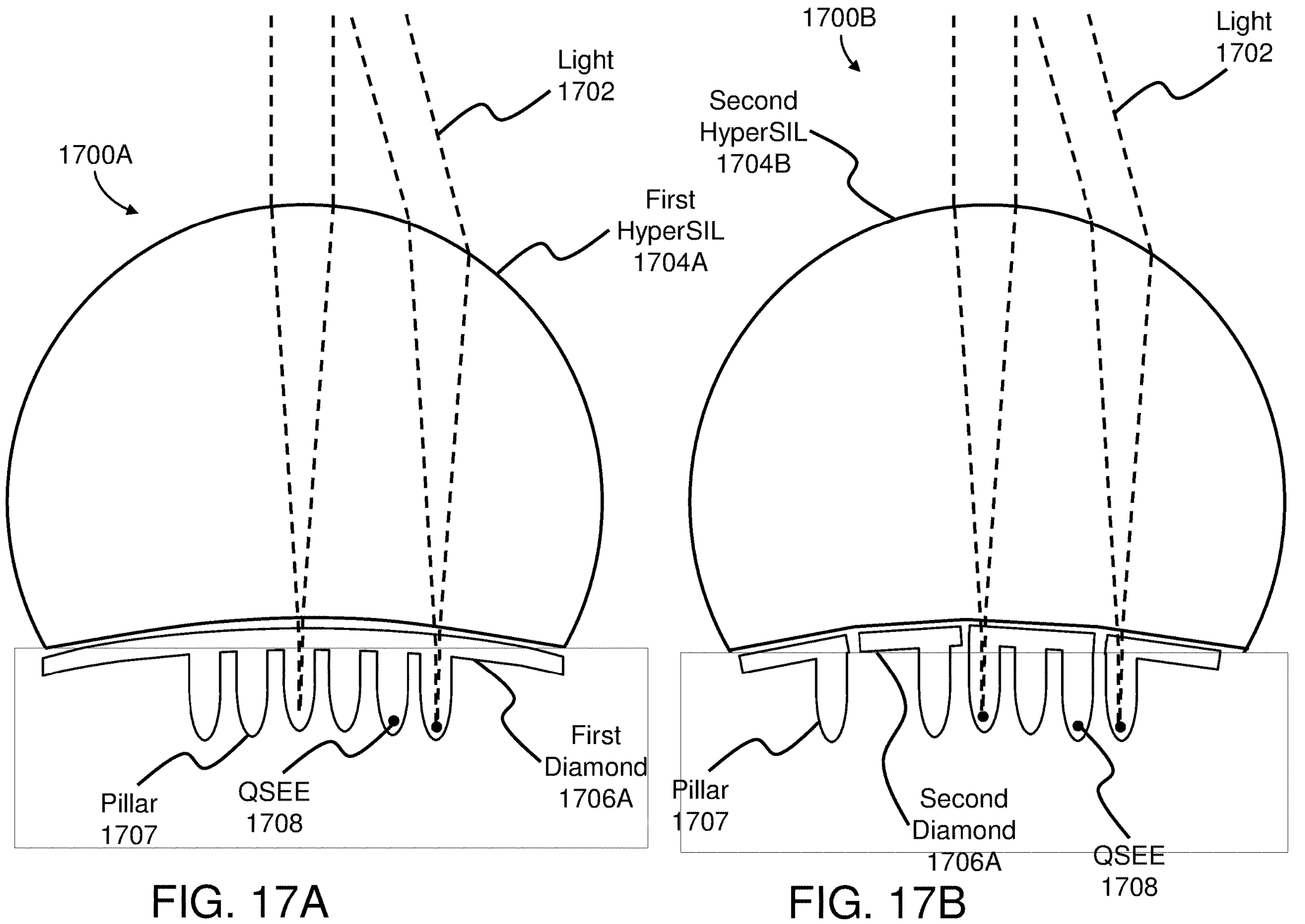
FIG. 17A is a schematic diagram of an example portion of a scanning structure.
FIG. 17B is a schematic diagram of an example portion of a scanning structure.

FIG. 17A shows a portion of an example scanning structure 1700A. Light 1702 enters a first hyperSIL 1704A and is directed through a first diamond 1706A and to two pillars 1707, one of which contains a QSEE 1708. In this example, the surface of the first diamond 1706A is curved to partially or wholly match the bottom curved surface of the first hyperSIL 1704A. In some examples, the back surface of the first hyperSIL 1704A is curved to match the focal surface of the first hyperSIL 1704AL, and the diamond conforms to the hyperSIL surface. The hyperSIL surface may be curved (e.g., as shown in FIG. 17A), or may be constructed of multiple planar segments approximating a curved surface (e.g., as shown in FIG. 17B), to match the curvature of the focal surface of the hyperSIL, or of the composite imaging system, which may not generally be planar. The diamond substrate (e.g., portions of the first diamond 1706A not comprising pillars 1707) can be sufficiently thin that the surface bonding forces overcome the stiffness of the diamond substrate, and the substrate conforms to the hyperSIL surface. This has the advantage that the various waveguide elements are simultaneously positioned along the focal surface of the imaging system.

FIG. 17B shows a portion of an example scanning structure 1700B. Light 1702 enters a second hyperSIL 1704B and is directed through a second diamond 1706B comprising multiple planar segments approximating a curved surface.

As summarized above, in one aspect, in general, an apparatus for interacting with a plurality of quantum states over a respective series of time intervals in a scanning period comprises: a housing comprising at least one optical fiber interface configured to provide a fiber-coupled optical mode that controls optical coupling to and/or from an optical fiber, where at least a portion of the optical fiber extends outside of an interior of the housing; an array of quantum state emission elements configured to be housed on or inside the housing, each quantum state emission element configured to provide a quantum state; one or more directional structures, where each of multiple portions of the one or more directional structure is configured to provide a preferential direction for an associated element-coupled optical mode that controls optical coupling to and from a different respective subset of one or more of the quantum state emission elements; and a scanning structure configured to be housed on or inside the housing and configured to change an overlap between the fiber-coupled optical mode and a different respective one of the element-coupled optical modes over each time interval of the series of time intervals.

Aspects can include one or more of the following features.

The quantum state emission elements comprise quantum state storage elements each configured to receive a quantum state that is temporarily stored and emitted after a duration of time.

The duration of time is longer than the scanning period.

The quantum state emission elements comprise lattice irregularities.

The lattice irregularities comprise light-emitting point defects in a crystal lattice material.

The crystal lattice material comprises diamond, silicon, or silicon carbide.

The optical fiber comprises a single mode optical fiber.

The housing comprises a chamber configured to surround the array of quantum state emission elements, the one or more directional structures, and the scanning structure.

The chamber comprises a cryogenic chamber configured to maintain a temperature within the cryogenic chamber of less than about 10 Kelvin.

The one or more directional structures comprise an array of pillars formed in a material that comprises the quantum state emission elements.

The one or more directional structures comprise a hemispherical optically transmissive material configured to cover a plurality of the subsets of one or more of the quantum state emission elements.

The scanning structure comprises a first scanning element configured to move a location of the optical fiber interface along a first axis.

The scanning structure comprises a second scanning element configured to change the overlap between the fiber-coupled optical mode and different respective ones of the element-coupled optical modes associated with directional structures along a second axis substantially perpendicular to the first axis.

In another aspect, in general, a method for interacting with a plurality of quantum states over a respective series of time intervals in a scanning period comprises: providing, from at least one optical fiber interface, a fiber-coupled optical mode that controls optical coupling to and/or from an optical fiber, where at least a portion of the optical fiber extends outside of an interior of a housing comprises the at least one optical fiber interface; providing a quantum state from each quantum state emission element in an array of quantum state emission elements housed on or inside the housing; providing, from each of multiple portions of one or more directional structures, a preferential direction for an associated element-coupled optical mode that controls optical coupling to and from a different respective subset of one or more of the quantum state emission elements; and scanning a scanning structure housed on or inside the housing to change an overlap between the fiber-coupled optical mode and a different respective one of the element-coupled optical modes over each time interval of the series of time intervals.

In another aspect, in general, an apparatus for interacting with a plurality of quantum states comprises: a housing comprising at least one optical interface providing at least 100 fiber-coupled optical modes, where at least a portion of the optical interface extends outside of an interior of the housing; an array of quantum state emission elements configured to be housed on or inside the housing, each quantum state emission element configured to provide a quantum state; and one or more directional structures, where each of multiple portions of the one or more directional structure is configured to provide a preferential direction for an associated element-coupled optical mode that controls optical coupling to and from a different respective subset of one or more of the quantum state emission elements.

Aspects can include one or more of the following features.

The at least one optical interface comprises one or more multi-mode optical fibers.

The at least one optical interface comprises at least one array of optical cores.

The apparatus further comprises: a scanning structure configured to change an overlap between at least one of the at least 100 fiber-coupled optical modes and at least one of the element-coupled optical modes, over a respective series of time intervals in a scanning period.

The scanning structure is located outside of the housing.

The scanning structure comprises one or more spatial light modulators configured to control optical coupling to and/or from the at least one optical interface.

At least one of the one or more spatial light modulators are located outside of the housing.

The scanning structure is configured to change the overlap between at least one of the at least 100 fiber-coupled optical modes and at least one of the element-coupled optical modes by interfering two or more of the at least 100 fiber-coupled optical modes.

The scanning structure is configured to change the overlap between at least one of the at least 100 fiber-coupled optical modes and at least one of the element-coupled optical modes by selectively exciting one or more of the optical modes of the at least 100 fiber-coupled optical modes.

In another aspect, in general, a method for interacting with a plurality of quantum states comprises: providing, from at least one optical fiber interface, at least 100 fiber-coupled optical modes, where at least a portion of the optical fiber extends outside of an interior of a housing comprises the at least one optical fiber interface; providing a quantum state from each quantum state emission element in an array of quantum state emission elements housed on or inside the housing; and providing, from each of multiple portions of one or more directional structures, a preferential direction for an associated element-coupled optical mode that controls optical coupling to and from a different respective subset of one or more of the quantum state emission elements.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for interacting with a plurality of quantum states over a respective series of time intervals in a scanning period, the apparatus comprising:

a housing comprising at least one optical fiber interface configured to provide a fiber-coupled optical mode that controls optical coupling to and/or from an optical fiber, where at least a portion of the optical fiber extends outside of an interior of the housing;

an array of quantum state emission elements configured to be housed on or inside the housing, each quantum state emission element configured to provide a quantum state;

one or more directional structures, where each of multiple portions of the one or more directional structures is configured to provide a preferential direction for an associated element-coupled optical mode that controls optical coupling to and from a different respective subset of one or more of the quantum state emission elements; and a scanning structure configured to be housed on or inside the housing and configured to change an overlap between the fiber-coupled optical mode and a different respective one of the element-coupled optical modes over each time interval of the series of time intervals;

wherein the scanning structure is configured to, over each time interval of the series of time intervals, actuate a steering mechanism to scan the fiber-coupled optical mode along a scanning path that intersects with different respective element-coupled optical modes associated with the quantum state emission elements arranged over a two-dimensional surface.

2. The apparatus of claim 1, wherein the quantum state emission elements comprise quantum state storage elements each configured to receive a quantum state that is temporarily stored and emitted after a duration of time.

3. The apparatus of claim 2, wherein the duration of time is longer than the scanning period.

4. The apparatus of claim 1, wherein the quantum state emission elements comprise lattice irregularities.

5. The apparatus of claim 4, wherein the lattice irregularities comprise light-emitting point defects in a crystal lattice material.

6. The apparatus of claim 5, wherein the crystal lattice material comprises diamond, silicon, or silicon carbide.

7. The apparatus of claim 1, wherein the optical fiber comprises a single mode optical fiber.

8. The apparatus of claim 1, wherein the housing comprises a chamber configured to surround the array of quantum state emission elements, the one or more directional structures, and the scanning structure.

9. The apparatus of claim 8, wherein the chamber comprises a cryogenic chamber configured to maintain a temperature within the cryogenic chamber of less than about 10 Kelvin.

10. The apparatus of claim 1, wherein the one or more directional structures comprise an array of pillars formed in a material that comprises the quantum state emission elements.

11. The apparatus of claim 10, wherein the one or more directional structures comprise a hemispherical optically transmissive material configured to cover a plurality of the subsets of one or more of the quantum state emission elements.

12. The apparatus of claim 1, wherein the scanning structure comprises a first scanning element configured to move a location of the optical fiber interface along a first axis.

13. The apparatus of claim 12, wherein the scanning structure comprises a second scanning element configured to change the overlap between the fiber-coupled optical mode and different respective ones of the element-coupled optical modes associated with directional structures along a second axis substantially perpendicular to the first axis.

14. The apparatus of claim 13, wherein the second scanning element comprises a reflective surface configured to rotate about an axis that is substantially parallel to the first axis.

15. A method for interacting with a plurality of quantum states over a respective series of time intervals in a scanning period, the method comprising:

providing, from at least one optical fiber interface, a fiber-coupled optical mode that controls optical coupling to and/or from an optical fiber, where at least a portion of the optical fiber extends outside of an interior of a housing comprising the at least one optical fiber interface;

providing a quantum state from each quantum state emission element in an array of quantum state emission elements housed on or inside the housing;

providing, from each of multiple portions of one or more directional structures, a preferential direction for an associated element-coupled optical mode that controls optical coupling to and from a different respective subset of one or more of the quantum state emission elements; and scanning a scanning structure housed on or inside the housing to change an overlap between the fiber-coupled optical mode and a different respective one of the element-coupled optical modes over each time interval of the series of time intervals;

wherein scanning the scanning structure comprises, over each time interval of the series of time intervals, actuating a steering mechanism to scan the fiber-coupled optical mode along a scanning path that intersects with different respective element-coupled optical modes associated with the quantum state emission elements arranged over a two-dimensional surface.

16. The apparatus of claim 1, wherein the scanning structure is configured to scan the fiber-coupled optical mode along the scanning path without rotating the fiber-coupled optical mode relative to an axis that is orthogonal to a plane over which the two-dimensional arrangement is arranged.

17. The apparatus of claim 1, wherein the scanning structure is configured to actuate the steering mechanism based at least in part on one or more fiducials positioned on the two-dimensional surface over which the quantum state emission elements are arranged.

18. An apparatus for interacting with a plurality of quantum states over a respective series of time intervals in a scanning period, the apparatus comprising:

a housing comprising at least one optical fiber interface configured to provide a plurality of fiber-coupled optical modes that control optical coupling to and/or from an optical fiber, where at least a portion of the optical fiber extends outside of an interior of the housing;

an array of quantum state emission elements configured to be housed on or inside the housing, each quantum state emission element configured to provide a quantum state;

one or more directional structures, where each of multiple portions of the one or more directional structures is configured to provide a preferential direction for an associated element-coupled optical mode that controls optical coupling to and from a different respective subset of one or more of the quantum state emission elements; and a scanning structure configured to be housed on or inside the housing and configured to change an overlap between the fiber-coupled optical mode and a different respective one of the element-coupled optical modes over each time interval of the series of time intervals;

wherein the scanning structure is configured to, over each time interval of the series of time intervals, scan different fiber-coupled optical modes of the plurality of fiber-coupled optical modes along different respective scanning paths that each intersect with different respective element-coupled optical modes associated with the quantum state emission elements arranged over a two-dimensional surface.

19. The apparatus of claim 18, wherein the quantum state emission elements comprise quantum state storage elements each configured to receive a quantum state that is temporarily stored and emitted after a duration of time.

20. The apparatus of claim 19, wherein the duration of time is longer than the scanning period.

21. The apparatus of claim 18, wherein the quantum state emission elements comprise lattice irregularities.

22. The apparatus of claim 21, wherein the lattice irregularities comprise light-emitting point defects in a crystal lattice material.

23. The apparatus of claim 22, wherein the crystal lattice material comprises diamond, silicon, or silicon carbide.

24. The apparatus of claim 18, wherein the optical fiber comprises a single mode optical fiber.

25. The apparatus of claim 18, wherein the housing comprises a chamber configured to surround the array of quantum state emission elements, the one or more directional structures, and the scanning structure.

26. The apparatus of claim 25, wherein the chamber comprises a cryogenic chamber configured to maintain a temperature within the cryogenic chamber of less than about 10 Kelvin.

27. The apparatus of claim 18, wherein the one or more directional structures comprise an array of pillars formed in a material that comprises the quantum state emission elements.

28. The apparatus of claim 27, wherein the one or more directional structures comprise a hemispherical optically transmissive material configured to cover a plurality of the subsets of one or more of the quantum state emission elements.

29. The apparatus of claim 18, wherein the scanning structure comprises a first scanning element configured to move a location of the optical fiber interface along a first axis.

30. The apparatus of claim 29, wherein the scanning structure comprises a second scanning element configured to change the overlap between the fiber-coupled optical mode and different respective ones of the element-coupled optical modes associated with directional structures along a second axis substantially perpendicular to the first axis.

31. The apparatus of claim 30, wherein the second scanning element comprises a reflective surface configured to rotate about an axis that is substantially parallel to the first axis.

32. A method for interacting with a plurality of quantum states over a respective series of time intervals in a scanning period, the method comprising:

providing, from at least one optical fiber interface, a plurality of fiber-coupled optical modes that control optical coupling to and/or from an optical fiber, where at least a portion of the optical fiber extends outside of an interior of a housing comprising the at least one optical fiber interface;

providing a quantum state from each quantum state emission element in an array of quantum state emission elements housed on or inside the housing;

providing, from each of multiple portions of one or more directional structures, a preferential direction for an associated element-coupled optical mode that controls optical coupling to and from a different respective subset of one or more of the quantum state emission elements; and scanning a scanning structure housed on or inside the housing to change an overlap between the fiber-coupled optical mode and a different respective one of the element-coupled optical modes over each time interval of the series of time intervals;

wherein scanning the scanning structure comprises, over each time interval of the series of time intervals, scanning different fiber-coupled optical modes of the plurality of fiber-coupled optical modes along different respective scanning paths that each intersect with different respective element-coupled optical modes associated with the quantum state emission elements arranged over a two-dimensional surface.

* * * * *